US010473803B2

(12) United States Patent
Tenghamn

(10) Patent No.: US 10,473,803 B2
(45) Date of Patent: Nov. 12, 2019

(54) MARINE SEISMIC VIBRATORS AND METHODS OF USE

(71) Applicant: PGS Geophysical AS, Oslo (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 516 days.

(21) Appl. No.: 14/061,433

(22) Filed: Oct. 23, 2013

(65) Prior Publication Data

US 2014/0226439 A1  Aug. 14, 2014

Related U.S. Application Data

(60) Provisional application No. 61/762,424, filed on Feb. 8, 2013.

(51) Int. Cl.
| | | |
|---|---|---|
| *G01V 1/04* | (2006.01) | |
| *B06B 1/02* | (2006.01) | |
| *G01V 1/145* | (2006.01) | |
| *G01V 1/38* | (2006.01) | |
| *B06B 1/04* | (2006.01) | |

(Continued)

(52) U.S. Cl.
CPC ............. *G01V 1/04* (2013.01); *B06B 1/0276* (2013.01); *B06B 1/045* (2013.01); *G01V 1/005* (2013.01); *G01V 1/145* (2013.01); *G01V 1/38* (2013.01); *G10K 9/121* (2013.01); *G01V 2210/1214* (2013.01); *G01V 2210/1293* (2013.01)

(58) Field of Classification Search
CPC .......... G01V 1/04; G01V 1/005; G01V 1/145; G01V 1/38; G01V 2210/1214; G01V 2210/1293; B06B 1/0276; B06B 1/045; G10K 9/121

USPC .......................................................... 367/143
See application file for complete search history.

(56) References Cited

U.S. PATENT DOCUMENTS

| | | | |
|---|---|---|---|
| 3,384,868 A | 5/1968 | Brown | |
| 3,978,940 A | 9/1976 | Bouyoucos | |
| 4,185,714 A | 1/1980 | Pascouet et al. | |

(Continued)

FOREIGN PATENT DOCUMENTS

| | | |
|---|---|---|
| CN | 101995584 | 3/2011 |
| EP | 0835462 | 1/2003 |

(Continued)

OTHER PUBLICATIONS

Eurasian Search Report dated Nov. 28, 2014, in the prosecution of Eurasian patent application 201490218, 1 page.

(Continued)

*Primary Examiner* — James R Hulka
*Assistant Examiner* — John T Nolan

(57) ABSTRACT

Embodiments relate to marine seismic vibrators for use in seismic surveying and associated methods of use. An embodiment provides a marine seismic vibrator comprising: a shell having a spring constant selected to provide a first resonance frequency within an operational frequency range of about 1 Hz and about 300 Hz; a driver disposed within the shell and having a first end and a second end; and a spring element coupled to the shell between the first end and the second end of the driver, wherein the spring element has a second mode of oscillation that provides a second resonance frequency within the operational frequency range.

22 Claims, 13 Drawing Sheets

(51) Int. Cl.
*G01V 1/00* (2006.01)
*G10K 9/12* (2006.01)

(56) References Cited

U.S. PATENT DOCUMENTS

| | | |
|---|---|---|
| 4,211,301 A | 7/1980 | Mifsud |
| 4,231,112 A | 10/1980 | Massa |
| 4,483,411 A | 11/1984 | Mifsud |
| 4,556,963 A | 12/1985 | Hugus et al. |
| 4,557,348 A | 12/1985 | Mifsud |
| 4,578,784 A | 3/1986 | Mifsud |
| 4,739,859 A | 4/1988 | Delano |
| 4,785,430 A | 11/1988 | Cole |
| 4,853,905 A | 8/1989 | Myers |
| 5,016,228 A | 5/1991 | Arnold et al. |
| 5,050,129 A | 9/1991 | Schultz |
| 5,126,979 A | 6/1992 | Rowe, Jr. et al. |
| 5,206,839 A | 4/1993 | Murray |
| 5,225,731 A | 7/1993 | Owen |
| 5,233,570 A | 8/1993 | Donskoy |
| 5,646,380 A | 7/1997 | Vaage |
| 5,757,726 A | 5/1998 | Tenghamn et al. |
| 5,757,728 A | 5/1998 | Tenghamn et al. |
| 5,805,529 A * | 9/1998 | Purcell .................. G10K 9/121 367/163 |
| 5,959,939 A | 9/1999 | Tenghamn et al. |
| 5,978,316 A | 11/1999 | Ambs |
| 6,009,047 A | 12/1999 | Barger |
| 6,041,888 A | 3/2000 | Tenghamn |
| 6,076,629 A | 6/2000 | Tenghamn |
| 6,076,630 A | 6/2000 | Ambs |
| 6,085,862 A | 7/2000 | Tenghamn |
| 6,230,840 B1 | 5/2001 | Ambs |
| 6,173,803 B1 | 11/2001 | Barger |
| 6,556,510 B2 | 4/2003 | Ambs |
| 6,606,958 B1 | 8/2003 | Bouyoucos |
| 6,624,539 B1 | 9/2003 | Hansen et al. |
| 6,711,097 B1 | 3/2004 | Engdahl |
| 6,851,511 B2 | 2/2005 | Tenghamn |
| 7,468,932 B2 | 12/2008 | Tenghamn |
| 7,539,079 B2 | 5/2009 | Hoogeveen et al. |
| 7,551,517 B2 | 6/2009 | Tenghamn |
| 7,551,518 B1 | 6/2009 | Tenghamn |
| 7,562,740 B2 | 7/2009 | Ounadjela |
| 7,881,158 B2 | 2/2011 | Tenghamn |
| 7,926,614 B2 | 4/2011 | Tenghamn et al. |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,205,711 B2 | 6/2012 | Hopperstad et al. |
| 8,261,875 B2 | 9/2012 | Eick et al. |
| 8,274,290 B2 | 9/2012 | Summerfield et al. |
| 8,331,198 B2 * | 12/2012 | Morozov .................. G01V 1/135 181/120 |
| 8,335,127 B2 | 12/2012 | Tenghamn |
| 8,342,288 B2 | 1/2013 | Eick et al. |
| 8,400,872 B2 | 3/2013 | Gulgne et al. |
| 8,427,901 B2 | 4/2013 | Lunde et al. |
| 8,441,892 B2 | 5/2013 | Morozov et al. |
| 8,446,798 B2 | 5/2013 | Tenghamn |
| 8,630,149 B2 | 1/2014 | Thompson et al. |
| 8,634,276 B2 | 1/2014 | Morozov et al. |
| 8,670,292 B2 | 3/2014 | Engdahl |
| 8,804,462 B2 | 8/2014 | Barbour et al. |
| 8,971,152 B2 | 3/2015 | Chelminski |
| 2003/0128628 A1 * | 7/2003 | Osborn .................. H04R 17/00 367/163 |
| 2006/0193203 A1 | 8/2006 | Tenghamn et al. |
| 2008/0253226 A1 | 10/2008 | Tenghamn et al. |
| 2009/0147626 A1 | 6/2009 | Vahida et al. |
| 2009/0279387 A1 | 11/2009 | Tenghamn et al. |
| 2010/0118646 A1 | 5/2010 | Tenghamn |
| 2010/0118647 A1 * | 5/2010 | Tenghamn ............. G01V 1/005 367/24 |
| 2010/0322028 A1 | 12/2010 | Tenghamn |
| 2011/0038225 A1 * | 2/2011 | Tenghamn ............. G01V 1/005 367/21 |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0158045 A1 | 6/2011 | Karlsen et al. |
| 2011/0162906 A1 | 7/2011 | Harper |
| 2011/0297476 A1 | 12/2011 | Harper et al. |
| 2011/0317515 A1 * | 12/2011 | Tenghamn ............. G10K 9/121 367/20 |
| 2012/0075955 A1 | 3/2012 | Dean |
| 2012/0081997 A1 | 4/2012 | Babour et al. |
| 2012/0113747 A1 | 5/2012 | Ferber |
| 2012/0147699 A1 | 6/2012 | Dellinger et al. |
| 2012/0147709 A1 | 6/2012 | Zowarka, Jr. et al. |
| 2012/0155217 A1 | 6/2012 | Dellinger et al. |
| 2012/0188845 A1 | 7/2012 | Jeffryes |
| 2012/0232780 A1 | 9/2012 | Delson et al. |
| 2012/0243377 A1 * | 9/2012 | Morozov ............... G01V 1/135 367/143 |
| 2012/0314536 A1 | 12/2012 | Bagaini |
| 2013/0037342 A1 | 2/2013 | Engdahl |
| 2013/0100777 A1 | 4/2013 | Ruet |
| 2014/0334254 A1 | 11/2014 | Zrostlik et al. |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 | 3/2015 | Tenghamn et al. |
| 2015/0085607 A1 | 3/2015 | Tenghamn |
| 2015/0085608 A1 | 3/2015 | Tenghamn et al. |

FOREIGN PATENT DOCUMENTS

| | | |
|---|---|---|
| EP | 2184619 A2 | 5/2010 |
| EP | 2284575 A2 | 2/2011 |
| RU | 93052952 | 2/1995 |
| RU | 2159945 | 11/1999 |
| WO | WO9530912 | 11/1995 |
| WO | WO9701770 | 1/1997 |
| WO | WO0071266 | 11/2000 |

OTHER PUBLICATIONS

European Search Report and Written Opinion for Application No. 14153915.7 dated Nov. 20, 2015.

Feng et al., "A Class IV Flextensional Device Based on Electrostrictive Poly(vinylidene fluoride-trifluoroethylene)".

Fons Ten Kroode et al., "Broadband seismic data—The importance of low frequencies," Geophysics, Mar.-Apr. 2013, pp. WA3-WA14, vol. 78, No. 2.

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, "PGS shows off electrical marine vibrator to capture 'alternative' seismic source market," First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Ralph S.Woollett, "Current Approaches to the Miniaturization and Pressure Release Problems of VLF Transducers," Naval Underwater Systems Center, Nov. 5, 1973.

Ralph S. Woollett, "Underwater Helmholtz-Resonator Transducers: General Design Principles," NUSC Technical.

(56) References Cited

OTHER PUBLICATIONS

Chinese Office Action and translation for Application No. 201400449383 dated May 2, 2017.
Australian Examination Report No. 1 for Application No. 2014200644 dated Mar. 30, 2017.
Eurasian Office Action for Application No. 201490218/31 dated Jul. 10, 2017.
Mexican Office Action for Application No. MX/a/2014/001575 dated Sep. 9, 2016.
Mexican Office Action for Application No. MX/a/2014/001575 dated Apr. 21, 2017.
Indonesian Examination Report for Application No. P00201400737 dated Sep. 19, 2018.

* cited by examiner

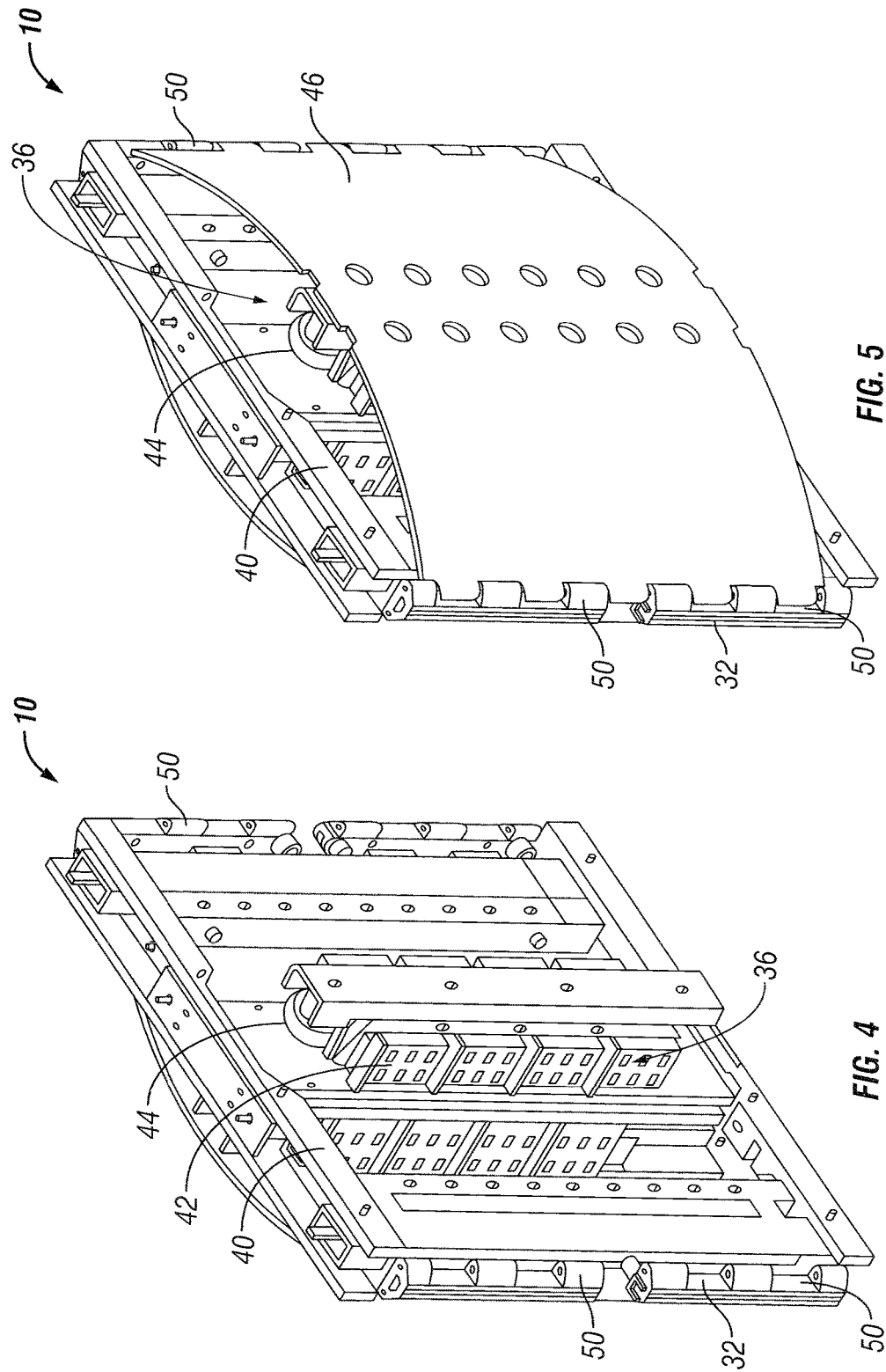

MARINE SEISMIC VIBRATORS AND METHODS OF USE

CROSS-REFERENCE TO RELATED APPLICATIONS

The present application claims the benefit of U.S. Provisional Application No. 61/762,424, filed Feb. 8, 2013, entitled "Marine Seismic Vibrator Array and Method of Use," the entire disclosure of which is incorporated herein by reference.

BACKGROUND

The present invention relates generally to marine seismic surveying. More particularly, in one or more embodiments, this invention relates to marine seismic vibrators for use in seismic surveying and associated methods of use.

Techniques for marine surveying include marine seismic surveying, in which geophysical data may be collected from below the Earth's surface. Seismic surveying has applications in mineral and energy exploration and production to help identify locations of hydrocarbon-bearing formations. Seismic surveying typically may include towing a seismic source below or near the surface of a body of water. One more "streamers" may also be towed through the water by the same or a different vessel. The streamers are typically cables that include a plurality of sensors disposed thereon at spaced apart locations along the length of each cable. Some seismic surveys locate sensors on ocean bottom cables or nodes in addition to, or instead of, streamers. The sensors may be configured to generate a signal that is related to a parameter being measured by the sensor. At selected times, the seismic source may be actuated to generate, for example, seismic energy that travels downwardly through the water and into the subsurface rock. Seismic energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Most of the seismic sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of seismic source that can be used in seismic surveying includes vibrator sources, including hydraulically powered sources, electro-mechanical vibrators, electrical marine seismic vibrators, and sources employing piezoelectric or magnetostrictive material. Vibrator sources typically generate vibrations through a range of frequencies in a pattern known as a "sweep" or "chirp."

It is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Accordingly, there has been a need for powerful low frequency marine sound sources operating in the frequency band of 1-100 Hz. However, both impulsive-type and vibrator sources that have been used may generate little or no energy below 20 Hz. In addition, low frequency sources typically may have poor efficiency, especially if a good impedance match cannot be obtained.

Thus, there is a need for improved seismic sources for use in marine surveying.

BRIEF DESCRIPTION OF THE DRAWINGS

These drawings illustrate certain aspects of some of the embodiments of the present invention and should not be used to limit or define the invention.

FIG. 4 illustrates another view an example embodiment of a marine seismic vibrator.

FIG. 5 illustrates another view an example embodiment of a marine seismic vibrator.

DETAILED DESCRIPTION

Embodiments of the present invention are directed to marine seismic vibrators. In comparison to the previously developed marine seismic vibrators, the marine seismic vibrators disclosed herein may have an improved acoustic output and improved reliability. Advantageously, the disclosed marine seismic vibrators may provide a resonance frequency in a lower end of the seismic frequency band (e.g., between 1 Hz to 300 Hz). Low frequency acoustic energy may be generated more efficiently with a low resonance frequency as the imaginary (reactive) part of the impedance is cancelled. Embodiments may include marine seismic vibrators having a stiffer shell than used heretofore to enable maintenance of the low resonance frequency. Embodiments may further include use of a spring element having a second resonance mode that provides a second resonance frequency within the seismic frequency band.

Figure 1:
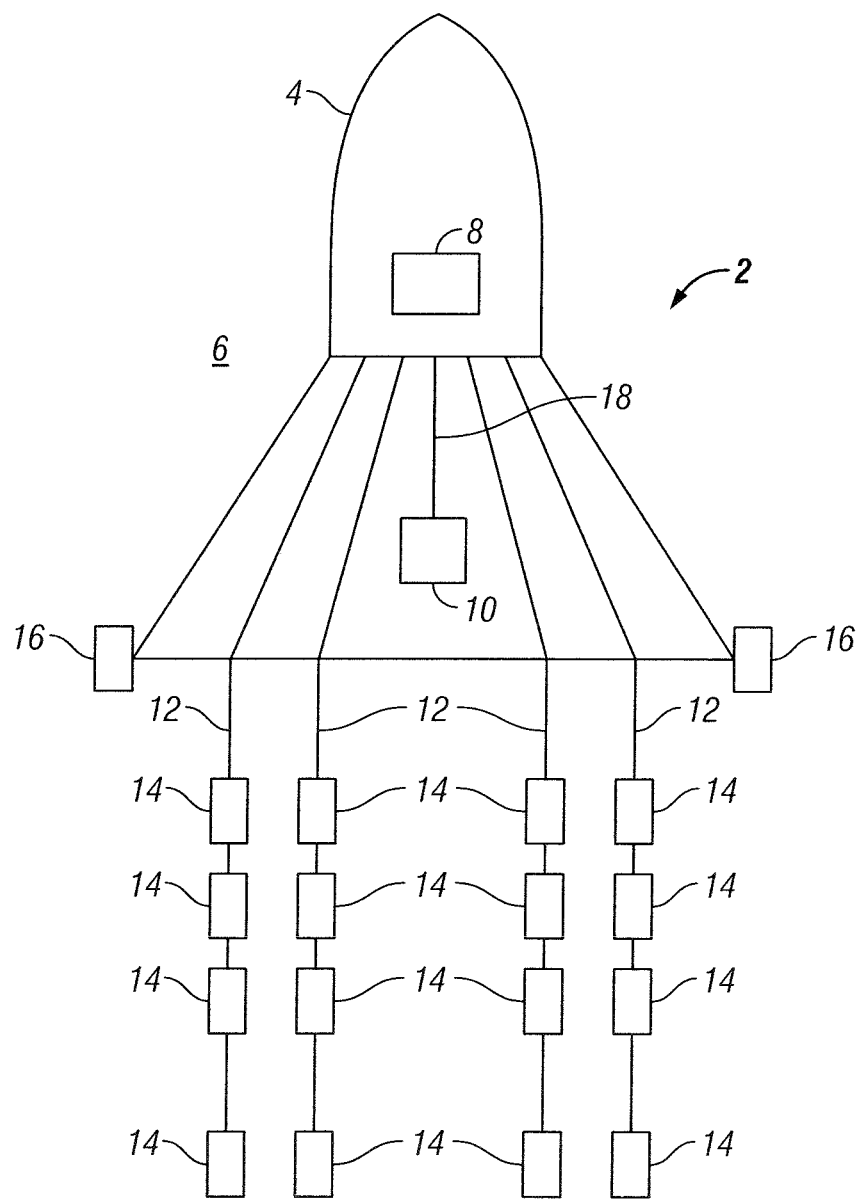
FIG. 1 illustrates an example embodiment of a marine seismic survey system using a marine seismic vibrator.

FIG. 1 illustrates a marine seismic survey system 2 in accordance with one embodiment of the present invention. In the illustrated embodiment, the system 2 may include a survey vessel 4 that moves along the surface of a body of water 6, such as a lake or ocean. The survey vessel 4 may include thereon equipment, shown generally at 8 and collectively referred to herein as a "recording system." The recording system 8 may include devices (none shown separately) for detecting and making a time indexed record of signals generated by each of seismic sensors (explained further below) and for actuating a marine seismic vibrator 10 at selected times. The recording system 8 may also include devices (none shown separately) for determining the geodetic position of the survey vessel 4 and the various seismic sensors.

As illustrated, the survey vessel 4 may tow sensor streamers 12. The sensor streamers 12 may be towed in a selected pattern in the body of water 6 by the survey vessel 4 or a different vessel. As illustrated, the sensor streamers 12 may be laterally spaced apart behind the survey vessel 4. "Lateral" or "laterally," in the present context, means transverse to the direction of the motion of the survey vessel 4. The sensor streamers 12 may each be formed, for example, by coupling a plurality of streamer segments end-to-end as explained in U.S. Pat. No. 7,142,481, the disclosure of which is incorporated herein by reference. The sensors streamers 12 may be maintained in the selected pattern by towing equipment 16, such as paravanes or doors that provide lateral force to spread the sensors streamers 12 to selected lateral positions with respect to the survey vessel 4. The sensor streamers 12 may have a length, for example, in a range of from about 2,000 meters to about 12,000 meters or longer. The configurations of the sensors streamers 12 on FIG. 1 is provided to illustrate an embodiment of the present invention and is not intended to limit the present invention. It should be noted that, while the present example, shows four sensor streamers 12, the invention is applicable to any number of streamers 12 towed by survey vessel 4 or any other vessel. For example, in some embodiments, more or less than four sensor streamers 12 may be towed by survey vessel 4, and the streamers 12 may be spaced apart laterally, vertically, or both laterally and vertically.

The sensors streamers 12 may include seismic sensors 14 thereon at spaced apart locations. The seismic sensors 14 may be any type of seismic sensors known in the art, including hydrophones, geophones, particle velocity sensors, particle displacement sensors, particle acceleration sensors, or pressure gradient sensors, for example. By way of example, the seismic sensors 14 may generate response signals, such as electrical or optical signals, in response to detecting seismic energy emitted from the marine seismic vibrators 10 after the energy has interacted with the rock formations (not shown) below the water bottom. Signals generated by the seismic sensors 14 may be communicated to the recording system 8.

As illustrated in FIG. 1, the survey vessel 4 or a different vessel may further tow marine seismic vibrator 10. In some embodiments, multiple marine seismic vibrators 10 may be used, which may be towed by the survey vessel 4 or different survey vessels, for example. Although only a single marine seismic vibrator 10 is shown, it should be understood that more than one marine seismic vibrator 10 may be used as desired for a particular application. A source cable 18 may couple the marine seismic vibrator 10 to the survey vessel. The source cable 18 may take drag forces and also may include electrical conductors (not shown separately) for transferring electrical current from the recording system 8 on the survey vessel 4 to the seismic sources 10. The source cable 18 may also include signal cables or fibers for transmitting signals to and/or from the marine seismic vibrator 10 to the recording system 8. The source cable 18 may also include strength members (not shown separately) for transmitting towing force from the survey vessel 4 to the marine seismic vibrator 10. The source cable 18 may also contain conductors for transmitting air to the marine seismic vibrator 10 for pressure compensation, for example. The source cable 18 may have a length in a range of from about 200 meters to about 2,000 meters or longer, for example. In some embodiments, the source cable 18 may be about 900 meters long and have an outer diameter of about 65 millimeters. In some embodiments, the source cable 18 may be relatively parallel to the surface of the body of water 6, while in other embodiments, the source cable 18 may utilize depth control mechanisms, for example, to locate more than one marine seismic vibrator 10 at a plurality of different depths.

In contrast to impulsive-type sources which transmit energy during a very limited amount of time, the marine seismic vibrator 10 may have a reduced environmental impact due the distribution of energy over time. In particular, the marine seismic vibrator 10 may have a reduced peak amplitude of the transmitted seismic signal during a seismic survey with little or no reduction in the data quality. For example, by using a marine seismic vibrator 10 with, for example, a five-second sweep, instead of an impulsive-type source such as an air gun, the peak amplitudes can be reduced by as much as 30 dB or even more. If pseudo-noise source sequences are used to not only spread out the energy over time but also the frequency over time, the peak amplitudes may be reduced by another 20 dB or even more. In some embodiments, the peak amplitudes may be in the range of about 10 dB to about 40 dB.

In some embodiments, the marine seismic vibrator 10 may include a flextensional shell-type source. A number of parameters may be employed in the design of the flextensional shell-type sources, several of which may relate to the shell itself and type of driver. In some embodiments, the marine seismic vibrator 10 may display at least two resonance frequencies in the seismic frequency band, typically a range between about 1 Hz and about 300 Hz. In some embodiments, the seismic frequency band may be between about 5 Hz and about 100 Hz.

The total impedance that may be experienced by the marine seismic vibrator 10 may be expressed as follows:

$$Z_r = R_r + jX_r \tag{Eq. 1}$$

where $Z_r$ is total impedance, $R_r$ is radiation impedance, and $X_r$ is reactive impedance.

In an analysis of the energy transfer of the marine seismic vibrator 10, the system may be approximated as a baffled piston. In the expression of the total impedance that will be experienced, the radiation impedance $R_r$ of a baffled piston may be:

$$R_r = \pi a^2 \rho_o c R_1(x) \tag{Eq. 2}$$

and the reactive impedance may be:

$$X_r = \pi a^2 \rho_o c X_1(x) \tag{Eq. 3}$$

where $$x = 2ka = (4\pi a/\lambda) = (2\omega a/c) \tag{Eq. 4}$$

and where $$R_1(x) = 1 - (2/x)J_{1(x)} \tag{Eq. 5}$$

and

-continued $$X_1(x) = \left(\frac{4}{\pi}\right)\int_0^{\pi/2} \sin(x\cos\alpha)\sin^2\alpha\, d\alpha \qquad \text{(Eq. 6)}$$

where $\rho_o$ is the density of water, $\omega$=radial frequency, k=wave number, a=radius of piston, c=sound velocity, $\lambda$=wave length, and $J_1$=Bessel function of the first order.

Using the Taylor series expansion on the above equations yields the following:

$$R_1(x) = \frac{x^2}{2^2 1!2!} - \frac{x^4}{2^4 2!3!} + \cdots \qquad \text{(Eq. 7)}$$

$$X_1(x) = \frac{4}{\pi}\left(\frac{x}{3} - \frac{x^3}{3^2 5} + \frac{x^5}{3^2 5^2 7} - \cdots\right) \qquad \text{(Eq. 8)}$$

For low frequencies, when x=2 ka is much smaller than 1, the real and imaginary part of the total impedance expression may be approximated with the first term of the Taylor expression. The expressions for low frequencies, when the wave length is much larger than the radius of the piston becomes:

$$R_1(x) = (\tfrac{1}{2})(ka)^2 \qquad \text{(Eq. 9)}$$

$$X_1(x) \rightarrow (8ka)/(3\pi) \qquad \text{(Eq. 10)}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. At resonance, the imaginary (reactive) part of the impedance is cancelled, and the marine seismic vibrator 10 may be able to efficiently transmit acoustic energy into the body of water 6.

However, having a low resonance frequency may be problematic for the design of the shell for the marine seismic vibrator 10. For example, a shell-type marine seismic vibrator 10 with reasonable small size combined with a low resonance may be problematic. Embodiments may provide a stiffer shell than used heretofore to enable maintenance of the resonance frequency in a lower end of the specified frequency band.

Figure 2:
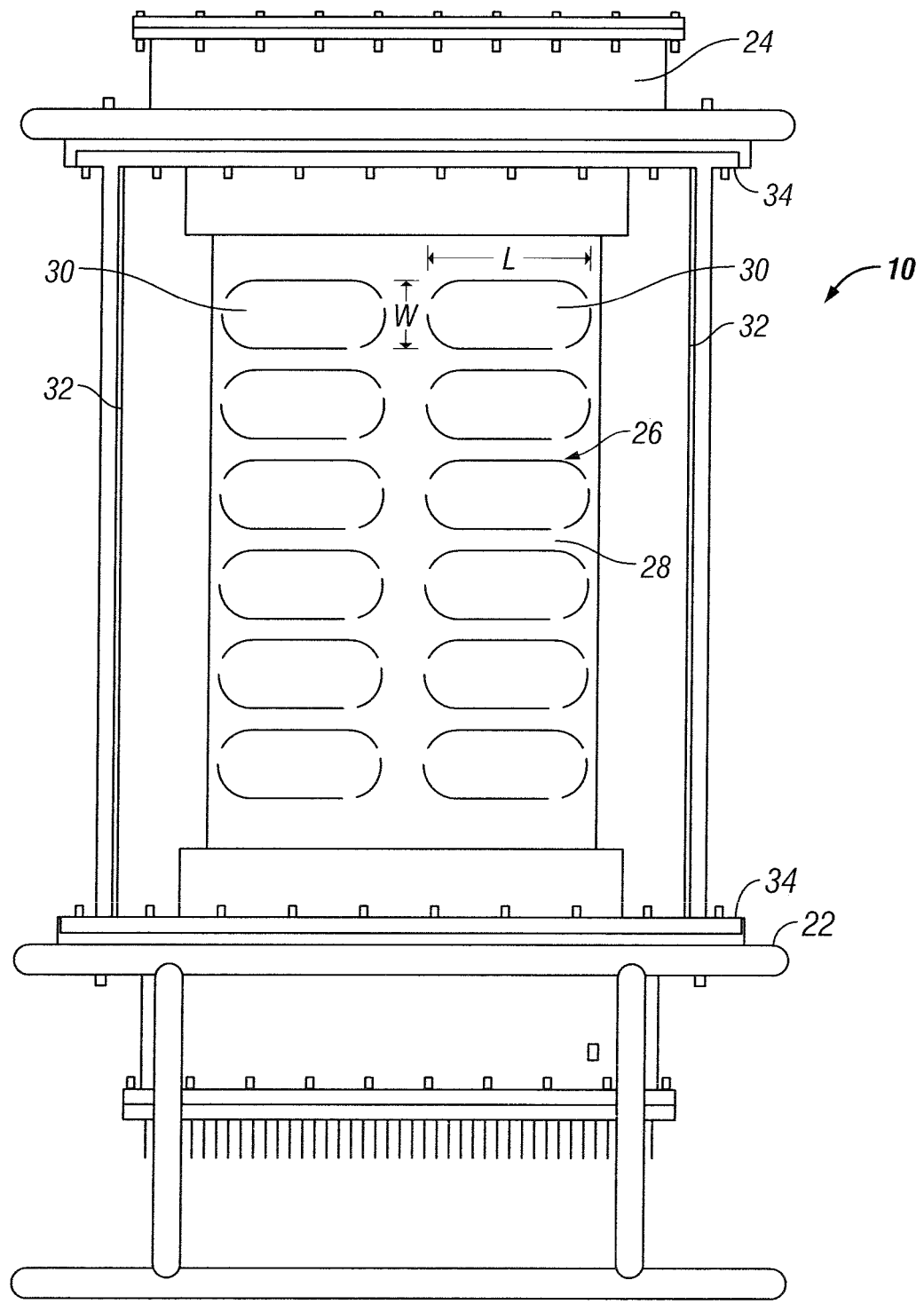
FIG. 2 illustrates an example embodiment of a marine seismic vibrator.

FIG. 2 illustrates an example implementation of a marine seismic vibrator 10. As illustrated, the marine seismic vibrator 10 may be mounted within a frame 22. A bracket 24 may be coupled to the top of the frame 22. The bracket 24 may be used for deploying the marine seismic vibrator 10 in the water. The marine seismic vibrator 10 may comprise a shell 26. The form of the shell 26 is generally referred to as being flextensional. In a particular embodiment, the shell 26 may comprise two shell side portions that may be mirror images of one another. FIG. 2 shows one of the side portions of the shell 26 designated as shell side portion 28. In the illustrated embodiment, the shell side portion 28 comprises ribs 30 spaced along an outer surface of the shell side portion 28. The ribs 30 may be used, for example, to reinforce the shell side portion 28 and make the shell side portion 28 more stiff. As illustrated, the ribs 30 may extend outwardly along the outer surface of the shell side portion 28. In the illustrated embodiment, the shell side portion 28 includes two columns of the ribs 30. The shell 26 may further comprise endbeams 32. As will be discussed in more detail below, the shell side portion 28 may be flexibly coupled to the endbeams 32 (e.g., using hinges 38 or some other flexible element as shown on FIG. 3). The shell 26 may complete a flextensional shell surrounding the other components of the marine seismic vibrator 10, which will be discussed in more detail below. With continued reference to FIG. 2, the marine seismic vibrator 10 may further comprise top and bottom endplates 34. The shell 26 may be sealingly attached to the top and bottom endplates 34. In some embodiments, the connection between the shell 26 and top and bottom endplates 34 may be a flexible connection.

Figure 3A:
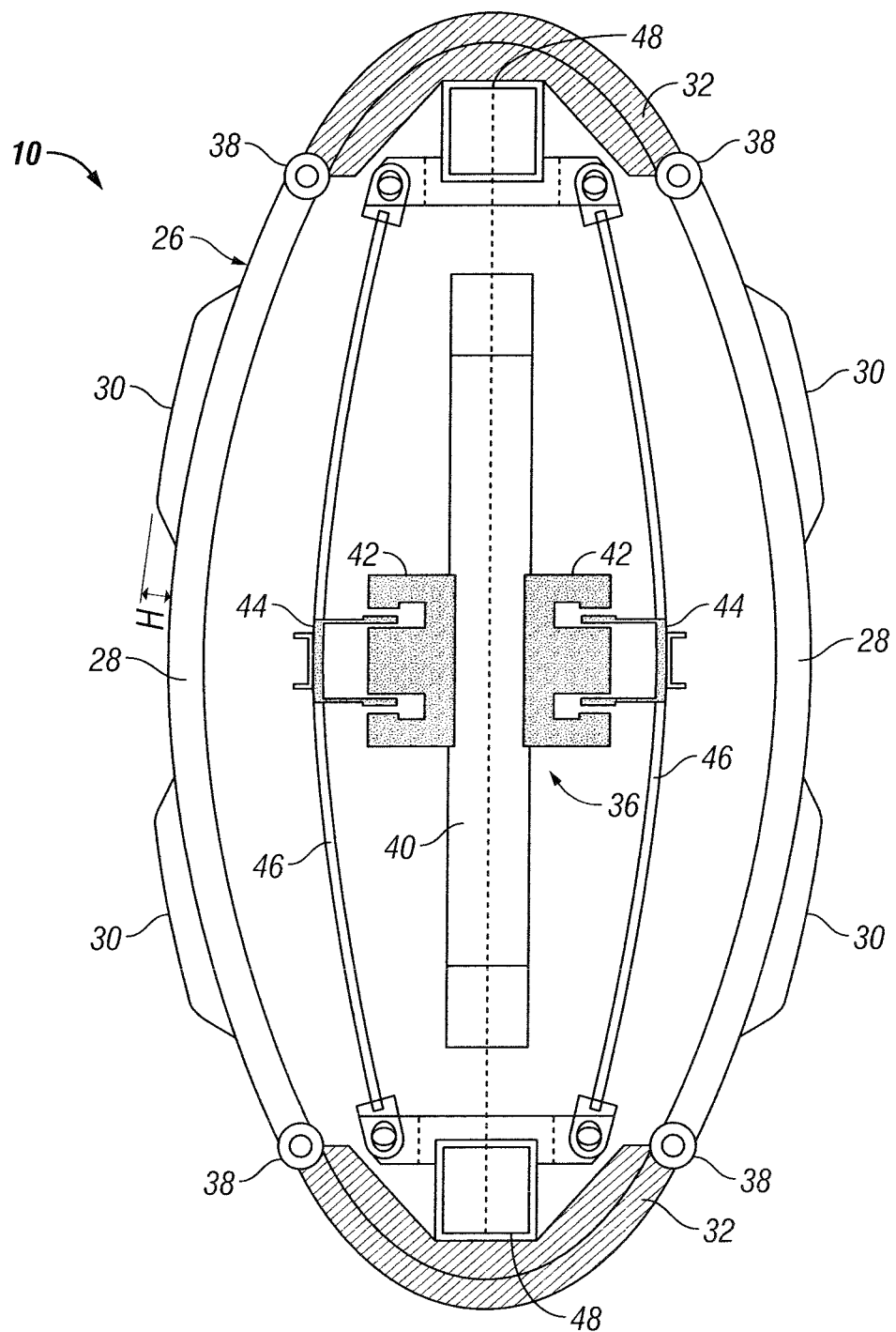
FIGS. 3a and 3b illustrate example embodiments of marine seismic vibrators in cross section.

FIG. 3a illustrates a marine seismic vibrator 10 in partial cross-section. For simplicity, the frame 22 and its associated components are not shown on FIG. 3a. As illustrated, the marine seismic vibrator 10 may include a linear drive 36, which may be an electro-dynamic actuator. In some embodiments, the linear drive 36 may be a "moving coil" or "voice coil" actuator, which may provide the ability to generate very large acoustic amplitudes. Seismic sources using one or more moving coil actuators may be referred to as "moving coil" projectors. Although FIG. 3 illustrates a single, bi-directional linear actuator, embodiments with one or more uni-directional drivers or in which a plurality of actuators are used in parallel are within the scope of the invention. In some embodiments, the force generated using the linear drive 36 may be twice that of the force generated in marine seismic vibrators used previously. Accordingly, the marine seismic vibrator 10 may have improved output power. To reduce fatigue of various components of the marine seismic vibrator 10 due, for example, to the increased force, embodiments may include increased size of the marine seismic vibrator 10 so that the vibration amplitude of the shell 26 may be about the same. In shallow water environments, cavitations at the surface of the marine seismic vibrator 10 may limit the power output.

The illustrated embodiment further includes a shell 26. As previously mentioned, the shell 26 may complete a flextensional shell surrounding the other components of the marine seismic vibrator 10, such as the linear drive 36. Although the shell 26 is depicted on FIG. 3a as being essentially elliptic in shape, flextensional shells of other shapes, including convex, concave, flat, or combinations thereof, may also be used in accordance with embodiments of the present invention. As illustrated, the shell 26 may comprise shell side portions 28. The shell side portions 28 may comprise spring steel, beryllium copper alloy, glass fiber reinforced plastic, carbon fiber reinforced or other suitable flexible spring material. Suitable flexible spring materials may have a high yield strength and not permanently deform when acted on by the linear drive 36. In some embodiments, the shell side portions 28 may be a class V flextensional transducer. In some embodiments, the dimensions, material make-up, and shape of the shell side portions 28 may be selected to provide a soft spring constant for vibrations of between about 1 Hz to about 300 Hz, alternatively, between about 5 Hz and about 100 Hz, when the marine seismic vibrator 10 is submerged in water, for example, at a depth of from about 1 meter to about 375 meters and, more particularly, from about 1 meter to about 100 meters. The shell side portions 28 may be coupled to endbeams 32. In the illustrated embodiment, the shell side portions 28 may be flexibly coupled to the endbeams 32 by hinges 38. This flexible coupling should allow for more stiff shell side portions 28 while still keeping the resonance frequency low. If the shell side portions 28 were directly coupled to the endbeams 32, the shell side portions 28 would have to be made less rigid to get the same resonance frequency.

The shell side portions 28 may be made stiffer by inclusion of ribs 30. As illustrated, the ribs 30 may be placed on either side of the shell mid-line to reinforce selected portions of the side portions 28 while leaving the mid-line weaker. In other words, the ribs 30 may be configured to force the shell side portions 28 bend at the mid-line. The ribs 30 may be positioned transverse to the midline of the shell side portions 28, wherein the midline of the shell side portions 28 extends from the top to the bottom of the shell side portions 28. The number and arrangement of the ribs 30 may be selected to reinforce certain portions of the shell side portions 28, thus forcing the shell side portions 28 to bend at their mid-line. For example, one or more ribs 30 may be positioned on either side of the midline in particular embodiments. In some embodiments, the ribs 30 may individually have a height H of from about 0.25 inches to about 5 inches and a width of from about 1 inch to about 20 inches, and length of from about 1 inch to about ¼ to ½ the width of the shell. The ribs may be hollow, filled, or solid as appropriate for a particular application. Convex of concave ribs may also be suitable. In addition, the ribs may be permanently or removably affixed to the shell side portions 28. In one particular embodiment, the shell side portions 28 and the ribs 30 may be unitary.

The shell side portions 28 stay in their first resonance mode by attachment of the ribs 30. While ribs 30 are shown, other reinforcing members could be used on the shell side portions 28 to provide a reinforced portion and force them to stay in the first resonance mode. For example, a metallic bar, reinforcing fibers, or other suitable reinforcing member may be included on the side portions 28 in a configuration to force the side portions 28 to bend at their mid-section. In some embodiments, the thickness of the side portions may be adjusted to force a bend at the mid-line, for example, by having a thinner portion at the mid-line. In some embodiments, the shell side portions 28 never reach their second resonance mode thereby achieving better performance acoustically. In some embodiments, the shell side portions 28 may comprise fiberglass, which gives more damping as compared to carbon fiber or steel. More damping may create a flat spectrum.

Figure 3B:
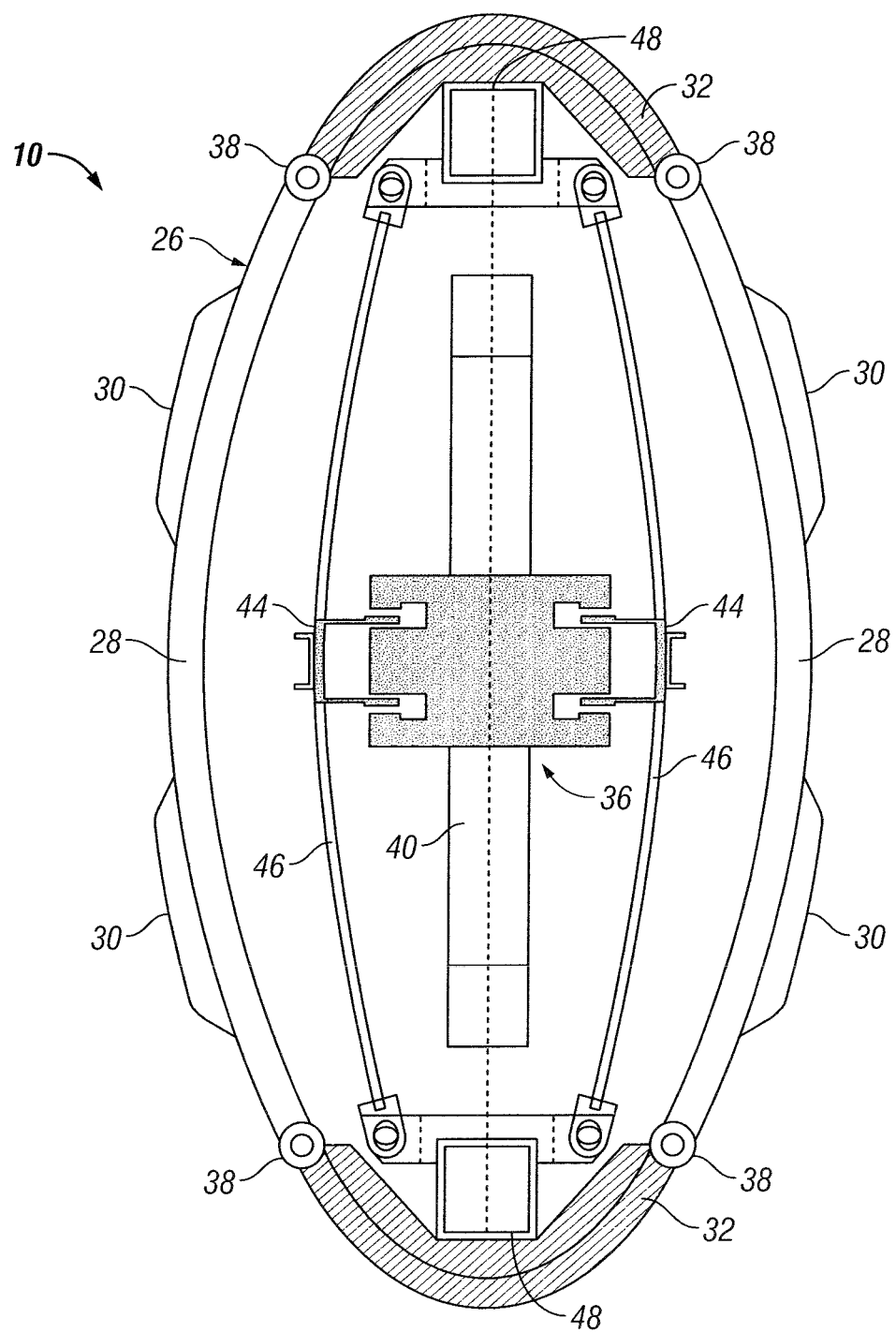

As further illustrated by FIG. 3a, the linear drive 36 may be centrally mounted on a fixture 40. The fixture 40 should be capable of suspending the linear drive 36 within the shell 26. While not illustrated, the fixture 40 may be coupled to the shell 26. For example, the fixture 40 may be coupled to the endbeams 32, for example, using linear bearings. In some embodiments, the linear drive 36 may comprise electromagnetic parts that may be mounted on the fixtures. For example, the linear drive 36 may comprise first electromagnetic parts 42, which may comprise permanent magnetic material, mounted on either side of the fixture 40. While FIG. 3a illustrates separate electromagnetic parts 42, it should be understood the magnetic parts 42 of the linear drive 36 may be shared. By way of example, FIG. 3b illustrates a linear drive 36 for a marine seismic vibrator in which the electromagnetic parts 42 are shared. Referring again to FIG. 3a, the linear drive 36 may further comprise a pair of drive coils 44 arranged on opposite sides of the fixture 40 from one another. The drive coils 44 may be coupled to corresponding spring elements 46. The drive coils 44 may extend from the transmission elements 46 into gaps in the first electromagnetic parts 42. When a current is sent through the drive coils 44, a magnetic field may be created. The magnetic field may interact with the field from the first magnetic parts 42, which may comprise permanent magnetic material, and provide relative movement of the parts. The resulting force for one of the drive coils 44 may be expressed by the following formula:

$$F = I \, l \, B \qquad \text{(Eq. 11)}$$

wherein I is the current in the particular drive coil 44, l is the length of the conductor in the drive coil 44, and B is the magnetic flux density. Depending on the desired force, either the size of the electromagnetic drive or the number of drives on each of the spring elements 46 may be varied. A transmission element may be used to transfer force from the linear drive 36 to the spring elements 46. More than one transmission element along the axis of the fixture 40 with at least one linear drive 36 may also be used. It is, however, advantageous if the sum of the forces on each side of the fixture 40 is symmetric relating to the frame axis to minimize strain on the construction. In the embodiment shown on FIG. 3, it is also an advantage if the sum of the force results in a vector being perpendicular to the main axis of the side shell portions 28.

The illustrated embodiment further includes spring elements 46. As illustrated, the spring elements 46 may be disposed within the shell 26. The spring elements 46 generally have two functions. One is to transform changes in length of the linear drive 36 into movement of the shell 26. The second function is to form a resonance system for more efficiently generating acoustic energy in a marine environment. In FIG. 3, an embodiment of the invention is shown in which the spring elements 46 may have a slightly arched shape. In embodiments, the spring elements 46 may be shaped as flexible plates, rods, beams, or bars, for example, and may preferably be rotatably fastened to the fastening devices 48. The distance from the central part of the spring elements 46 to the axis between the fastening devices 48 may be substantially less than the distance from the central part to the fastening devices 48. Thusly, a transmission is provided in which a large movement of the drive coils 44 on the spring elements 46, but with a relatively small force, leads to a small movement of the fastening devices 48, but with a correspondingly larger force. In embodiments, the transmission may depend on the curvature of the spring elements 46. The fastening devices 48 are shown in the illustrated embodiments as beams, but the fastening of the spring elements 46 to the shell 26 may also be done directly to the shell 26. Embodiments of the shell 26 may be elliptic as shown in FIG. 3. When the fastening devices 48 may be pulled inwards by the spring elements 46 the ellipse may widen, creating a pressure wave in the environment. This way the movements of the linear drive 36 should propagate outwards and result in acoustic waves in the water. By varying the eccentricity of the ellipse and the transmission rate in the linear drive 36, embodiments may be adapted to different situations. It should be understood that the present invention should not be limited to the particular configuration shown on FIG. 3, and other configurations of the marine seismic vibrator 10 may be used in accordance with embodiments of the present invention. By way of example, the fastening devices 48 may be fastened directly to pistons (not shown), in which a relatively large movement of the drive coils 44 should provide a small movement of the pistons. In this example, the fixture 40 may also extend at least partially outside the spring elements 46 so that the first electromagnetic parts 42 may be positioned outside the drive coils 44.

Additional details of an example implementation of a marine seismic vibrator 10 will now described with reference to FIGS. 4 and 5. As illustrated, the marine seismic vibrator 10 may comprise a linear drive 36. The first magnetic parts 42 of the linear drive 36 is shown on FIG. 4, but is obstructed from view on FIG. 5. One of the pair of drive coils 44 of the linear drive 36 is shown on FIGS. 4 and 5. The other one of the drive coils 44 is obstructed from view in the illustrated embodiments. A spring element 46 is further shown on FIG. 5 but is removed from FIG. 4 to more clearly illustrate the linear drive 36. Opposite ends of the spring element 46 may be coupled to inner hinges 50 on endbeams 32, enabling, for example, contraction of the transmission element 46. The endbeams 32 may be coupled to the fixture 40. As previously mentioned, the fixture 40 may be provided for suspending the linear drive 36 within the shell 26 (e.g., shown on FIG. 3). When fully assembled, a second spring element (not shown) which may comprise a substantially mirror image of the spring element 46 can be hingedly coupled by the inner hinges 50 to complete an inner shell surrounding the linear drive 36. The hinged connection between the endbeams 32 and the spring element 46, in some embodiments, acts to maintain a resonance frequency for the spring element 46 within the seismic frequency band without limiting strength of the spring element 46. In other words, if the spring element 46 was directly connected to the endbeams 32, the spring element 46 would need to be made less rigid to provide for a low resonance frequency. While not illustrated on FIG. 4, the shell 26 (e.g., shown on FIGS. 2 and 3) would generally surround the inner shell formed by the spring element 46. Although FIG. 3 illustrates the spring element 46 being a curved plate, transmission elements of other shapes, including convex, concave, semi-elliptical, flat, or combinations thereof may be used in accordance with embodiments of the present invention. The spring element 46 may comprise spring steel, beryllium copper alloy, glass fiber reinforced plastic, carbon fiber reinforced or other suitable flexible spring material. Suitable flexible spring materials may have a high yield strength and not permanently deform when acted on by the linear drive 36. In some embodiments, the spring element 46 may be a class V flextensional transducer. In some embodiments, the dimensions, material make-up, and shape of the spring element 46 may be selected to provide a soft spring constant for vibrations of between about 1 Hz to about 300 Hz, alternatively, between about 5 Hz and about 100 Hz, when the marine seismic vibrator 10 is submerged in water. In addition, the spring element 46 should be configured, for example, to provide an additional resonance frequency, in addition to that generated by shell 26 (e.g., shown on FIGS. 2 and 3).

As previously described, the marine seismic vibrator 10 may display at least two resonance frequencies within a seismic frequency band, typically a range between about 1 Hz and about 300 Hz. The first resonance frequency may result from interaction of the shell 26 with the equivalent fluid mass, e.g., the body of water in which the seismic vibrator may be disposed. The shell 26 may be made stiffer to provide a lower resonance frequency. The second resonance frequency may result from interaction of the spring element 46 with the linear drive 36. These two resonance frequencies may be selected independently providing a large degree of flexibility when optimizing the performance. In some embodiments, the first resonance frequency may be within a two octave band of the low end of the seismic frequency band and, alternatively, within one octave bend. In some embodiments, the second resonance frequency may be within a four octave band of the first resonance frequency and, alternatively, within three octave bands. By way of example, assuming a seismic frequency band of from 5 Hz to 25 Hz, a first resonance frequency may be 7 Hz and a second resonance frequency may be 22 Hz. A high efficiency may be achieved if two resonance frequencies separated in the frequency band of interest are used.

Dependent upon the desired acoustic output, it may be desirable, in some embodiments to use an array of marine seismic vibrators 10, which may be flextensional shell-type sources, such as those shown on FIGS. 2-4. For example, two or more marine seismic vibrators 10 (e.g., array 68 comprising low frequency marine seismic vibrators 10a and high frequency marine seismic vibrators 10b on FIG. 12) may be used contemporaneously or even simultaneously. As would be understood by one of ordinary skill in the art with the benefit of this disclosure, energy emitted from the array would appear in the rock formations below the water bottom as if it emanated from a point source when the dimensions of the array are on the order of 30 meters or less. The array 68 of marine seismic vibrators 10 may comprise one or more low frequency marine seismic vibrators 10a, for example, operating in the range of about 5 Hz to about 25 Hz and one or more high frequency vibrators 10b operating from about 25 Hz to about 100 Hz. In some embodiments, the one or more of the low frequency marine seismic vibrators 10a and the one or more of the high frequency marine seismic vibrators 10b may each have two resonance frequencies. In one particular embodiment, the marine seismic vibrator array 68 may comprise four low frequency marine seismic vibrators 10a operating from about 5 Hz to about 25 Hz, and eight high frequency marine seismic vibrators 10b operating from about 25 Hz to about 100 Hz. A reduction of about 3 dB may be anticipated at frequencies between about 100 and about 105 Hz. High power may be generated with two or more marine seismic vibrators 10 operating in the seismic frequency band. In some embodiments, one or more additional marine seismic vibrators 10 may operate from about 100 Hz to about 200 Hz. A smaller marine seismic vibrator 10 may be used to cover this higher frequency range, for example.

Mathematic models may be used to predict acoustic response based on marine seismic vibrator configurations. In certain embodiments, mathematic models may be used to predict the acoustic response, with targets of 190 dB from 5 Hz to 10 Hz and 200 dB from 10 Hz to 100 Hz. Adjustments made to the mathematical models may include, for example, a slight reduction of the spring constant for the low frequency marine seismic vibrator to meet the target at 5 Hz (resonance changed from 8 Hz to 7 Hz) and slightly increasing the spring constant of the spring element 46 of the high frequency source to increase the second resonance to 90 Hz, for example. To maintain vibration amplitude of the shell 26 in the same range, the physical sizes of the sources may be increased. This may help to reduce or potentially eliminate possible fatigue issues.

Accordingly, embodiments may use the following mathematical model. The model may use equivalent circuit diagram to calculate the acoustic performance. The model may have the following input parameters: 1) Geometry of the marine seismic vibrator 10, including major axis of shell 26, minor axis of the shell 26, length of the shell 26, spring constant of the shell 26, and spring constant of the spring element 46; 2) Force generated by linear drive 36; 3) Masses including shell 26 mass major axis, shell 26 mass minor axis, mass of spring element 46, and mass of drive coils 44; and 4) Transformation factor of the shell 26 and the spring element 46.

An equivalent piston radius may be calculated for the shell 26 in the x- and y-axis:

$$ax = \sqrt{\frac{Sx}{\pi}} \qquad \text{(Eq. 12)}$$

$$ay = \sqrt{\frac{Sy}{\pi}}$$

wherein ax is the equivalent piston radius in the x-axis, Sx is the surface area in the x-direction, ay is the equivalent piston radius in the y-axis, and Sy is the surface area in the y-direction.

From these values, the equivalent fluid mass and radiation resistance in x- and y-direction may be calculated as follows:

$$rx = \frac{\rho}{2 \cdot c} \cdot \omega^2 \cdot \pi \cdot ax^4 \quad \text{(Eq. 13)}$$

$$ry = \frac{\rho}{2 \cdot c} \cdot \omega^2 \cdot \pi \cdot ay^4 \quad \text{(Eq. 14)}$$

$$mx = \rho \cdot 8 \cdot \frac{ax^3}{3} \quad \text{(Eq. 15)}$$

$$my = \rho \cdot 8 \cdot \frac{ay^3}{3} \quad \text{(Eq. 16)}$$

Wherein rx is the radiation resistance in the x-direction, $\rho$ is the density of water, $\omega$ is angular frequency, ax is the equivalent piston radius for the shell 26 in the x-axis, ry radiation resistance in the y-direction, ay is the equivalent piston radius for the shell 26 in the y-axis, mx is the equivalent fluid mass in the x-direction, and my is the equivalent fluid mass in the y-direction.

From these values, the total impedance of the marine seismic vibrator 10 may be calculated as follows:

$$Z = ry + \omega \cdot my \cdot j + \omega \cdot m_1 \cdot j + \frac{4 \cdot K}{\omega} \cdot (-j) + T^2 \cdot (rx + \omega \cdot j + \omega \cdot m_2 \cdot j) \quad \text{(Eq. 17)}$$

Wherein Z is total impedance, ry is the radiation resistance in the y-direction, $\omega$ is angular frequency, my is the equivalent fluid mass in the y-direction, j is an imaginary number, $m_1$ is source mass in the y-direction, K is the spring constant for the shell 26, T is the transformation factor for the shell 26, rx is the radiation resistance in the x-direction, mx is the equivalent fluid mass in the x-direction, $m_2$ is the source mass in the x-direction.

The first resonance frequency, ft, of the marine seismic vibrator 10 may appear when:

$$fr = \frac{1}{2 \cdot \pi} \sqrt{\frac{4 \cdot K}{m_1 + 2 \cdot my + T^2(mx + m_2)}} \quad \text{(Eq. 18)}$$

Wherein K is the spring constant for the shell 26, $m_1$ is source mass in the y-direction, my is the equivalent fluid mass in the y-direction, T is the transformation factor for the shell 26, mx is the equivalent fluid mass in the x-direction, $m_2$ is the source mass in the x-direction.

Impedance, Z, and available force amplitude, Fmax, may limit the velocity, Vo, of the shell 26:

$$Vo\left(\frac{F\max}{|Z|}\right) \quad \text{(Eq. 19)}$$

The source output level, P, of the marine seismic vibrator 10 may then be calculated with the following formula:

$$P = 10 \cdot \log\left(T^2 \cdot 2 \cdot rx \cdot \frac{V^2}{8.37 \cdot 10^{-18}}\right) + \quad \text{(Eq. 20)}$$
$$9 \cdot \exp\left[\frac{(f - fr)^2}{\left(\frac{fr}{4}\right)^2}\right] + 9 \cdot \exp\left[\frac{(f - f_{spring\_element})^2}{\left(\frac{f_{spring\_element}}{4}\right)^2}\right]$$

Wherein T is the transformation factor of the shell 26, rx is the radiation resistance in the x-direction, V is velocity of the shell, f is frequency, $f_r$ is the first resonance frequency in the shell 26, and $f_{spring\_element}$ is the second resonance frequency in the spring element 46. The second term in the source output level is related to the shell 26 resonance and the third term is resulting from the second resonance frequency in the spring element 46 connected to the drive coils 44.

It should be understood that embodiments of the model can been tuned to correlate with several different sources of varying sizes, frequency, etc. In embodiments, the dominating parameters may be the equivalent fluid mass acting on the shell 26 and the spring constant of the shell 26. It typically occurs, for example, that the smaller the source, the smaller the mass and the lower spring constant.

Figure 6:
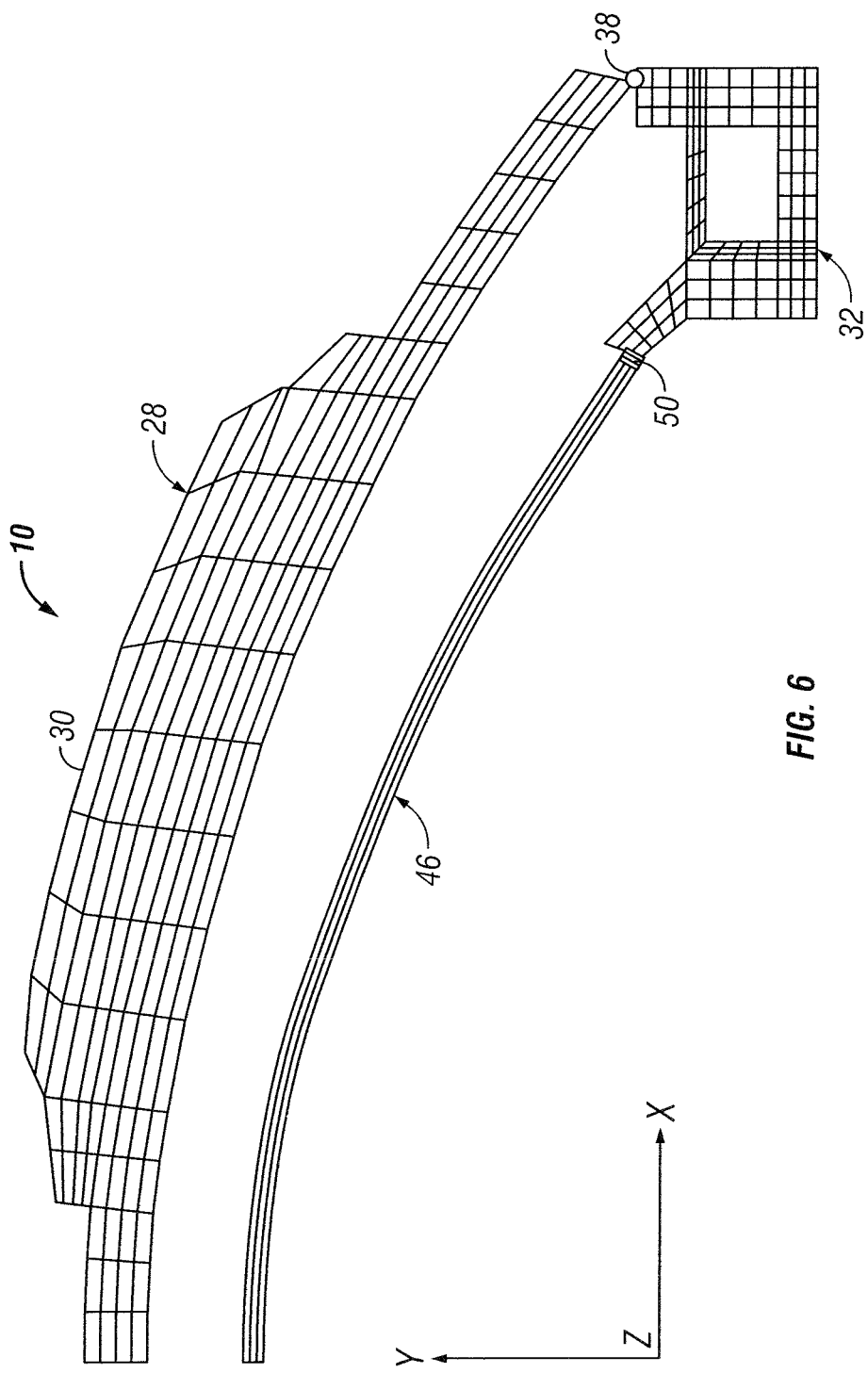
FIG. 6 is a frequency model showing a first mode of oscillation of the spring element of an example embodiment of a marine seismic vibrator.
Figure 7:
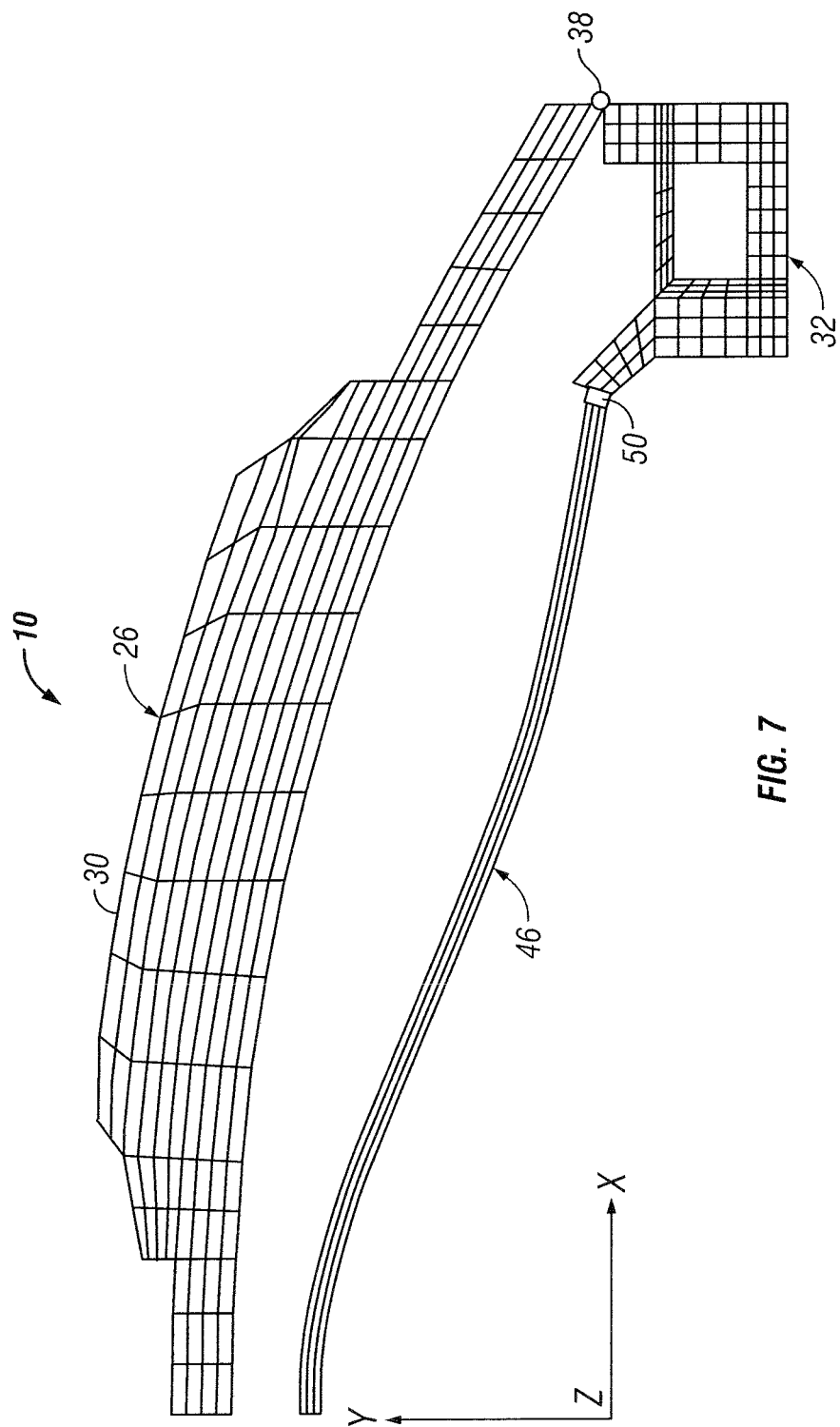
FIG. 7 is a frequency model showing a second mode of oscillation of the spring element of an example embodiment of a marine seismic vibrator.

FIGS. 6 and 7 are frequency models showing the first and second modes of oscillation for a marine seismic vibrator 10 according to example embodiments. As previously described, the marine seismic vibrator 10 may comprise a spring element 46 coupled to an endbeam 32 by inner hinges 50. The marine seismic vibrator 10 may further comprise an outer side portion 28 coupled to endbeams 32 by hinges 38. The outer side portion 28 may comprise ribs 30. FIG. 6 shows the first mode of oscillation or first resonance mode for the spring element 46. FIG. 7 shows the second mode of oscillation or second resonance mode of the spring element 46. As best seen in FIG. 7, the spring element 46 is out of phase with the outer side portion 28. A spring element 46 with free ends may have frequencies give by the following:

$$F_n = \frac{\pi K}{8L^2} \sqrt{\frac{E}{\rho}[3.011^2, 5^2, 7^2, \ldots, (2n+1)^2]} \quad \text{(Eq. 21)}$$

Wherein F is frequency, K is the radius of gyration, L is the length of the spring element 46, E is the Young's modulus, and p is density.

Figure 8:
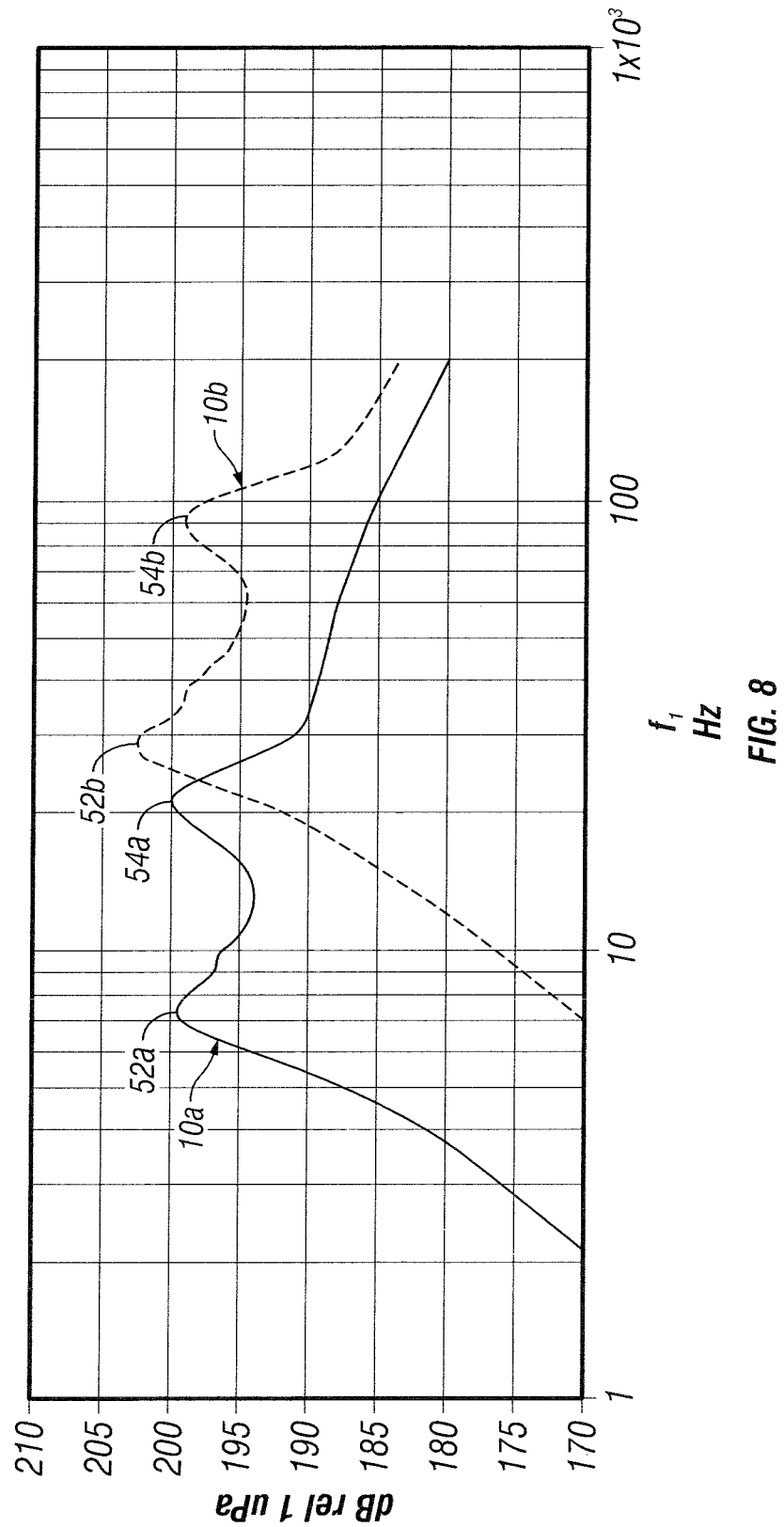
FIG. 8 is a simulated amplitude spectra for an example implementation of a pair of marine seismic vibrators with two resonances.
Figure 9:
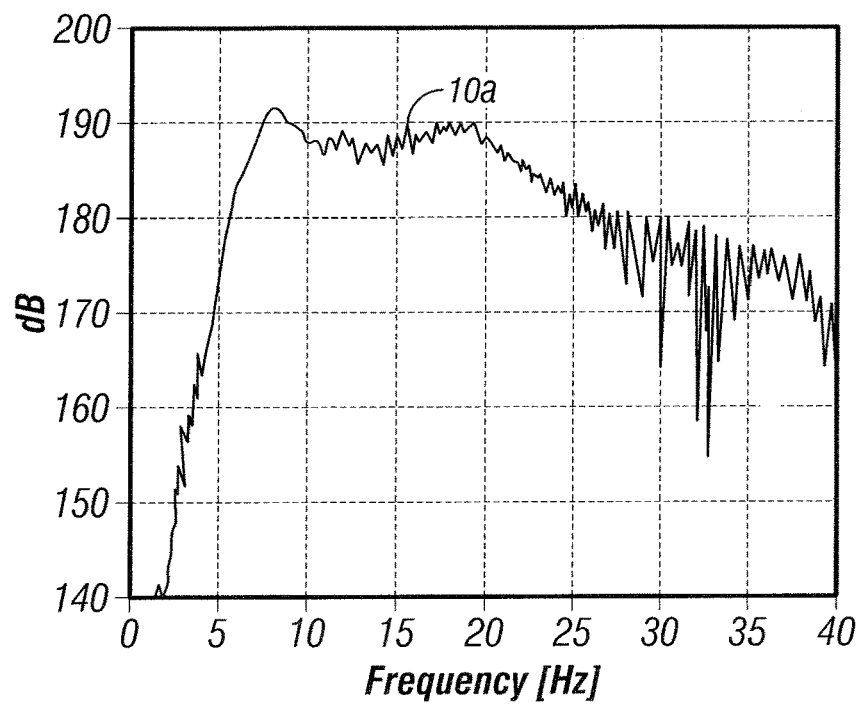
FIG. 9 is a measured amplitude spectra for an example embodiment of a low frequency marine seismic vibrator.
Figure 10:
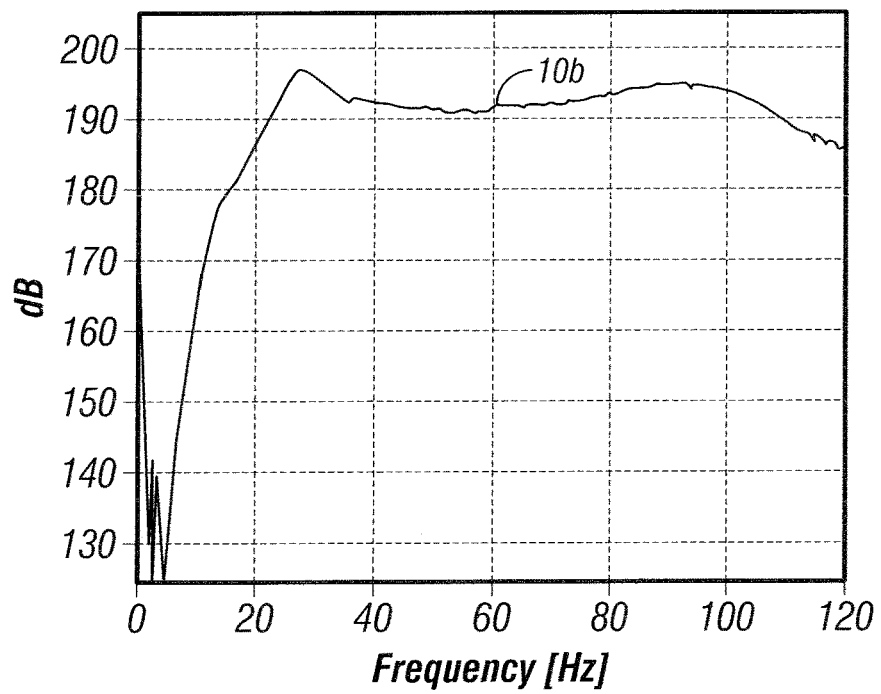
FIG. 10 is a measured amplitude spectra for an example embodiment of a high frequency marine seismic vibrator.

FIG. 8 shows the results of a finite element simulation of a pair of marine seismic vibrators 10, denoted as low frequency marine seismic vibrator 10a and high frequency marine seismic vibrator 10b. As illustrated, the low frequency marine seismic vibrator 10a has a first resonance frequency 52a resulting from interaction of the shell 26 with the equivalent fluid mass and a second resonance frequency 54a resulting from interaction of the spring elements 36 with the linear drive 36. As further illustrated, the high frequency marine seismic vibrator 10b has a first resonance frequency 52b resulting from interaction of the shell 26 with the equivalent fluid mass and a second resonance frequency 54b resulting from interaction of the spring elements 36 with the linear drive 36. As shown by FIGS. 9 and 10, embodiments of the low frequency marine seismic vibrator 10a (FIG. 9) and the high frequency marine seismic vibrator 10b (FIG. 10) may have a uniquely flat frequency response.

Figure 11:
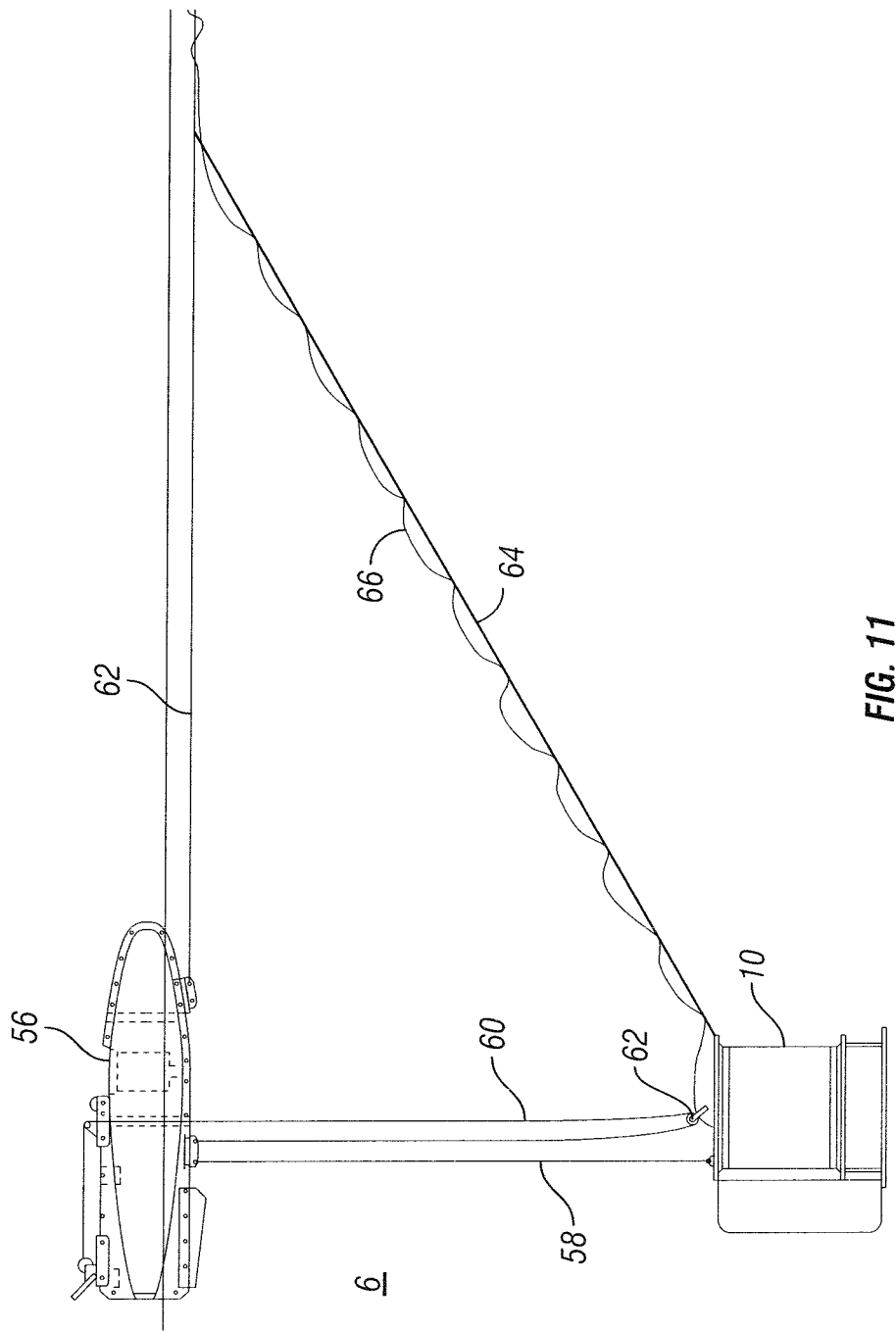
FIG. 11 illustrates an example implementation for towing a marine seismic vibrator through a body of water.

Referring now to FIG. 11, a towing arrangement for a marine seismic vibrator 10 is shown in more detail in accordance with embodiments of the present invention. In some embodiments, the marine seismic vibrator 10 may be towed at a speed of up to about 5 knots or even greater. For water depths of less than 2 meters, continuous towing may not be possible, and a static (stop-go) deployment system and operating technique may be used. The marine seismic vibrator 10 may be coupled to flotation device 56 by one or more suspension lines, such as holding wire 58 and lifting wire 60. In some embodiments, fins may be added to the marine seismic vibrator 10, for example, to increase stability. The holding wire 58 may be selected so that the marine seismic vibrator 10 may be operated at a selected depth in the body of water 6. In some embodiments, the depth may be about 1 meter to about 150 meters and alternatively from about 1 meter to about 50 meters. In alternative embodiments, the depth may be at least about 1 meter, at least about 15 meters, at least about 150 meters or deeper. In some embodiments, the marine seismic vibrator 10 may be pressure compensated such that the interior pressure may be kept the same as the outer pressure. For shallow water operations, the water depth limit may be only set by the size of the shell 26 (e.g., shown on FIGS. 2 and 3).

Lifting wire 60 may be used to lift the marine seismic vibrator 10 as needed to adjust its depth in the body of water 6 or for retrieval or deployment. Example techniques for adjusting depth of a marine seismic vibrator 10 are described in more detail in United States Patent Publication No. 2011/0158045, the disclosure of which is incorporated herein by reference. As illustrated, there may be a pulley 62 on the marine seismic vibrator 10 to facilitate this adjustment with lifting wire 60. Flotation device 56 may be used to suspend the marine seismic vibrator 10 in the body of water 6. As illustrated, a tow rope 62 or other suitable line may be coupled to the flotation device 56, for example, to transmit towing force from the survey vessel 4 (e.g., shown on FIG. 1). A cable 64 may extend from the tow rope 62 to the marine seismic vibrator 10 to assist in positioning in the body of water 6. A separate signal line 66 may also be used to transmit signals and/or power to the marine seismic vibrator 10, for example. It should be noted that the towing configuration shown on FIG. 11 is merely illustrative and is not intended to limit the present invention. Other suitable towing configurations may be used in accordance with embodiments of the present invention.

Figure 12:
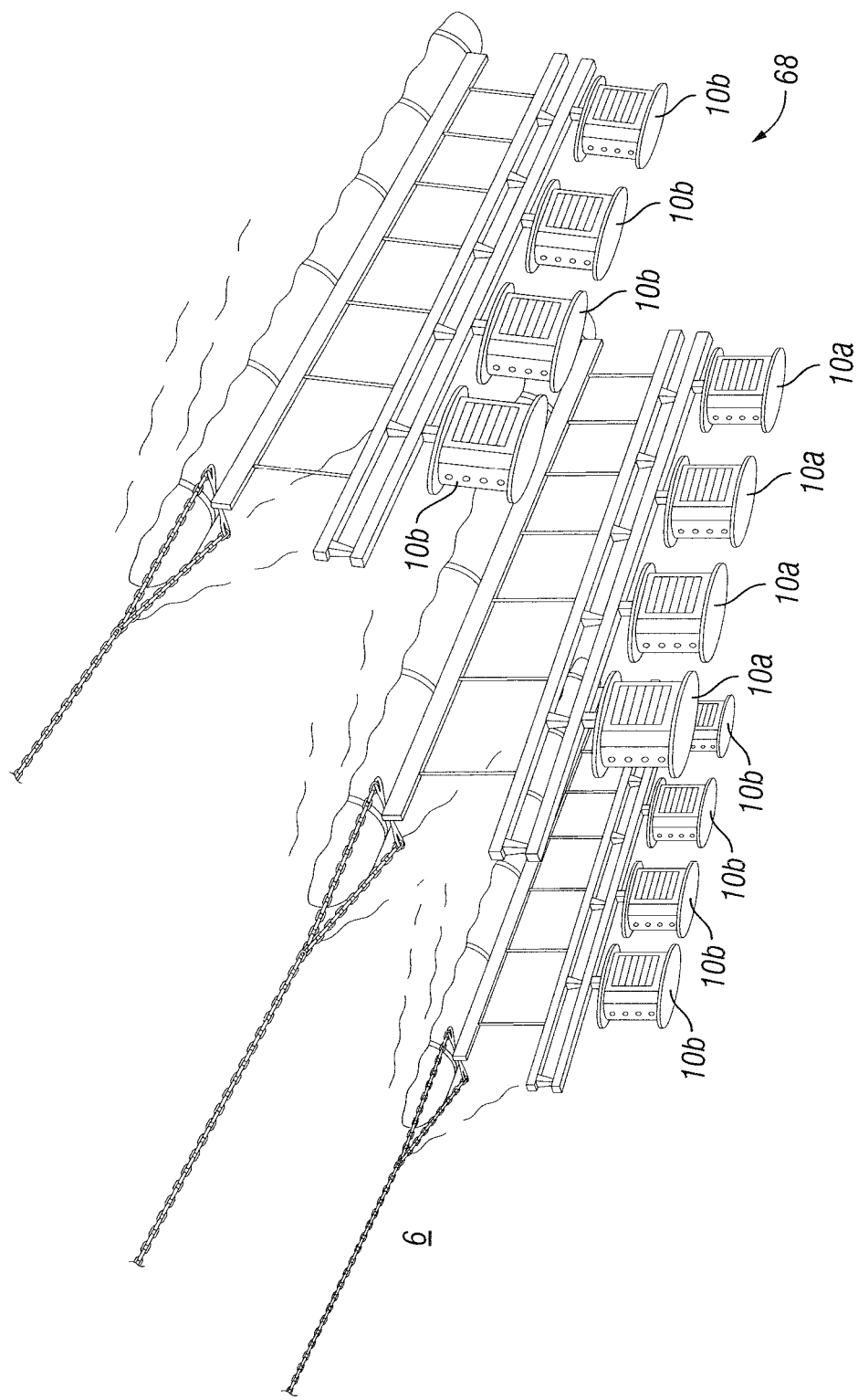
FIG. 12 illustrates an example implementation of an array of marine seismic vibrators as towed through a body of water.

As previously mentioned, an array of the marine seismic vibrators 10 shown on FIGS. 2-4, for example, may be used in accordance with embodiments of the present invention. FIG. 12 illustrates an array 68 of marine seismic vibrators 10 towed through a body of water 6. In the illustrated embodiment, the marine seismic vibrators 10 are denoted as low frequency marine seismic vibrators 10a and high frequency marine seismic vibrators 10b. The low frequency marine seismic vibrators 10a may be operated, for example, in the range of about 5 Hz to about 25 Hz, and the high frequency marine seismic vibrators 10b may be operated from about 25 Hz to about 100 Hz. In some embodiments, the low and high frequency marine seismic vibrators 10a, 10b may be operated simultaneously. By way of example, the low and high frequency marine seismic vibrators 10a, 10b may be operated at the same time, for example by use of orthogonal signals using cross-correlation properties such as pseudo-noise signals. Correlation noise may be low as the low and high frequency marine seismic vibrators 10a, 10b use different frequencies. As illustrated, the array 68 may comprise three sub-arrays that each comprises four low or high frequency marine seismic vibrators 10a or 10b. In the illustrated embodiment, there are two outer sub-arrays that each comprises four high frequency marine seismic vibrators 10b and an inner sub-array that comprises four low frequency marine seismic vibrators 10a. The sub-arrays may be separated by a distance of from about 2 meters to about 30 meters, for example about 8 meters to about 10 meters. The low frequency marine seismic vibrators 10a may be towed at depth of about 1 meter to about 75 meters and, alternatively, at about 25 meters. The high frequency marine seismic vibrators 10b may be towed at a depth of about 1 meter to about 25 meters and, alternatively, at about 8 meters. Towing the low and high frequency marine seismic vibrators 10a, 10b at a selected depth may create a ghost-free array, and the selected depth may be referred to as the optimum depth. By making use of the surface ghost, an additional 6 dB may be gained. An additional 6 dB may be gained when the depth corresponds to a quarter of a wavelength generated.

Embodiments may include use of a nonlinear sweep to enhance output of particular frequency band, or the number of marine seismic vibrators 10 can be increased to thereby avoid the frequency bands where the amplitude spectrum is below a specified value. The amplitude curves for the single units may be expressed in Sound Pressure Level (SPL) un-ghosted. SPL refers to the level of a sound wave in a particular frequency. To compare this to amplitude spectrum from an air gun array, the following analysis may be used:

$$\text{Amplitude spectrum} = SPL - 10 \log(\text{bandwidth}). \quad \text{(Eq. 22)}$$

Accordingly, for the low frequency marine seismic vibrators 10a with a bandwidth of 5 Hz to 22 Hz, there is the following:

$$\text{Amplitude spectrum} = SPL - 10 \log(17) = SPL - 12.3 \text{ dB} \quad \text{(Eq. 23)}$$

For a 5-second long sweep, 3 dB are gained each time the length is doubled (starting at 1 s) to provide the following:

$$\text{Amplitude spectrum} = SPL - 12.3 \text{ dB} + 7 \text{ dB} = SPL - 5.3 \text{ dB} \quad \text{(Eq. 24)}$$

Assuming that the output is doubled with 6 dB each time the number of marine seismic vibrators 10 is doubled, 12 dB can be gained for the low frequency marine seismic vibrator 10a (4 sources). The amplitude spectrum for the array of low frequency marine seismic vibrators 10a may be:

$$\text{Amplitude spectrum}(\text{dB}/\sqrt{\text{Hz}}) = SPL + 6.7 \text{ dB} \quad \text{(Eq. 25)}$$

Since the two low and high frequency marine seismic vibrators 10a, 10b may operate at the same time, but in different frequency ranges, the above methodology may be performed for the high frequency marine seismic vibrators 10b. Accordingly, for high frequency marine seismic vibrators 10b with a bandwidth of 22-105 Hz, there is the following:

$$\text{Amplitude spectrum} = SPL - 10 \log(83) = SPL - 19 \text{ dB} \quad \text{(Eq. 26)}$$

For a 5-second long sweep, 3 dB are gained each time the length is doubled (starting at 1 s) to provide the following:

$$\text{Amplitude spectrum} = SPL - 19 \text{ dB} + 7 \text{ dB} = SPL - 12 \text{ dB} \quad \text{(Eq. 27)}$$

Assuming that the output is doubled with 6 dB each time the number of high frequency marine seismic vibrators 10b is doubled, 18 dB are gained for the high frequency marine seismic vibrators 10*b* (8 sources). The amplitude spectrum for the array of high frequency marine seismic vibrators 10*b* may be:

Amplitude spectrum(dB/sqrt Hz)=*SPL*+6 dB    Eq. 28)

Each sweep may correlated individually and summed together to get the correlation peak for the array.

Embodiments of the high frequency marine seismic vibrators 10*b* may drop off above 100 Hz and may have a notch at around 150 Hz. Accordingly, extending the bandwidth of the high frequency marine seismic vibrators 10*b* to 200 Hz may lower the efficiency of the high frequency marine seismic vibrators 10*b* and waste energy. If an array should cover from about 5 Hz to about 200 Hz, embodiments may further include a smaller source to cover the frequency band from about 100 Hz to about 200 Hz. The smaller source may then be towed, for example, at a depth of from about 2 to about 3 meters to benefit from the surface ghost. By way of example, the size of such a source may be fairly small compared to low and high frequency marine seismic vibrators 10*a*, 10*b* previously discussed. In some embodiments, the small source may have a width of 0.55 meters, a height of 0.6 meters, and thickness of 0.22 meters. Embodiments that use three different sources for the bandwidth from about 5 Hz to about 200 Hz may have improved benefits of both cost and efficiency.

Figure 13:
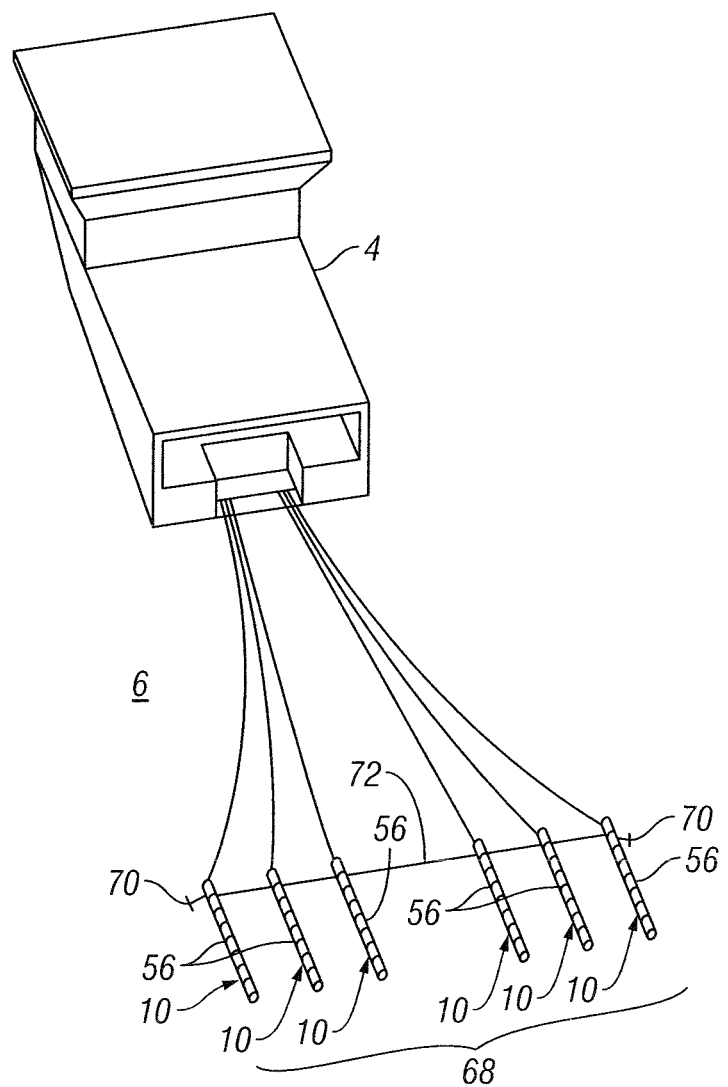
FIG. 13 illustrates an example implementation of steering control for an array of marine seismic vibrators.

In some embodiments, the marine seismic vibrators 10 may be steered laterally, For example, in some operations, it may be beneficial to repeat the source position from a previous survey. FIG. 13 illustrates an example of steering control for one or more arrays 68 of marine seismic vibrators 10. As illustrated, the one or more arrays 68 of marine seismic vibrators 10 may be towed by the survey vessel 4. In FIG. 13, the flotation device 56 is shown while the structure of the marine seismic vibrators 10 themselves is obstructed from view beneath the surface of the body of water 6. As illustrated, lateral movement of the marine seismic vibrators 10 may be controlled by one or more deflectors 70, which may be coupled to the one or more arrays 68. The deflectors 70 may be a paravane, door, other suitable device for providing lateral force to the one or more arrays 68. The deflectors 70 may be configured to provide a lateral component of force as they are towed through the water 6 by the survey vessel 4 and in accordance with present embodiments, the lateral component can be adjustable or controllable. The lateral motion component of each deflector 70 may be opposed to that of the other deflector 70 and, generally, in a direction outward from the centerline of the vessel 4. The combined lateral motion of the deflectors 70 may separate the deflectors 70 from each other until they put one or more spreader ropes or cables 72, functionally coupled end-to-end between the deflectors 70, into tension. As will be appreciated by those skilled in the art, the actual lateral separation between the marine seismic vibrators 10 may be related to the tension on the spreader ropes or cables 72. In one aspect of the invention, the deflectors 70 can be "steered" to exert adjustable lateral force, such that the tension on the spreader cables 72 can be controlled, and/or the lateral position of the marine seismic vibrators can be adjusted with respect to the survey vessel 4.

The dimensions of the marine seismic vibrators 10 may vary as needed for a particular application. For example, the marine seismic vibrators 10 (or smaller source discussed above) may have a shell 26 size as follows: 1) Width ranging from about 0.5 meters to about 4 meters, 2) Thickness ranging from about 0.2 meters to about 3 meters, and 3) height ranging from about 0.5 meters to about 4 meters. In particular embodiments, the low frequency marine seismic vibrators 10*a* may have a shell 26 size as follows: 1) Width 1.50 meters, 2) Thickness 0.60 meters, and 3) Height 1.70 meters. In particular embodiments, the high frequency marine seismic vibrators 10*b* may have a shell 26 size as follows: 1) Width 0.95 meters, 2) Thickness 0.40 meters, and 3) Height 1.10 meters. Embodiment of the marine seismic vibrators 10 may have a weight from about 100 kg to about 10,000 kg. In particular embodiments, the low frequency marine seismic vibrators 10*b* may have a weight of about 1600 kg in air, and the high frequency marine seismic vibrators 10*a* may have a weight of about 750 kg in air. In some embodiments, the marine seismic vibrators 10 may be neutrally buoyant in the body of water 6.

Figure 14:
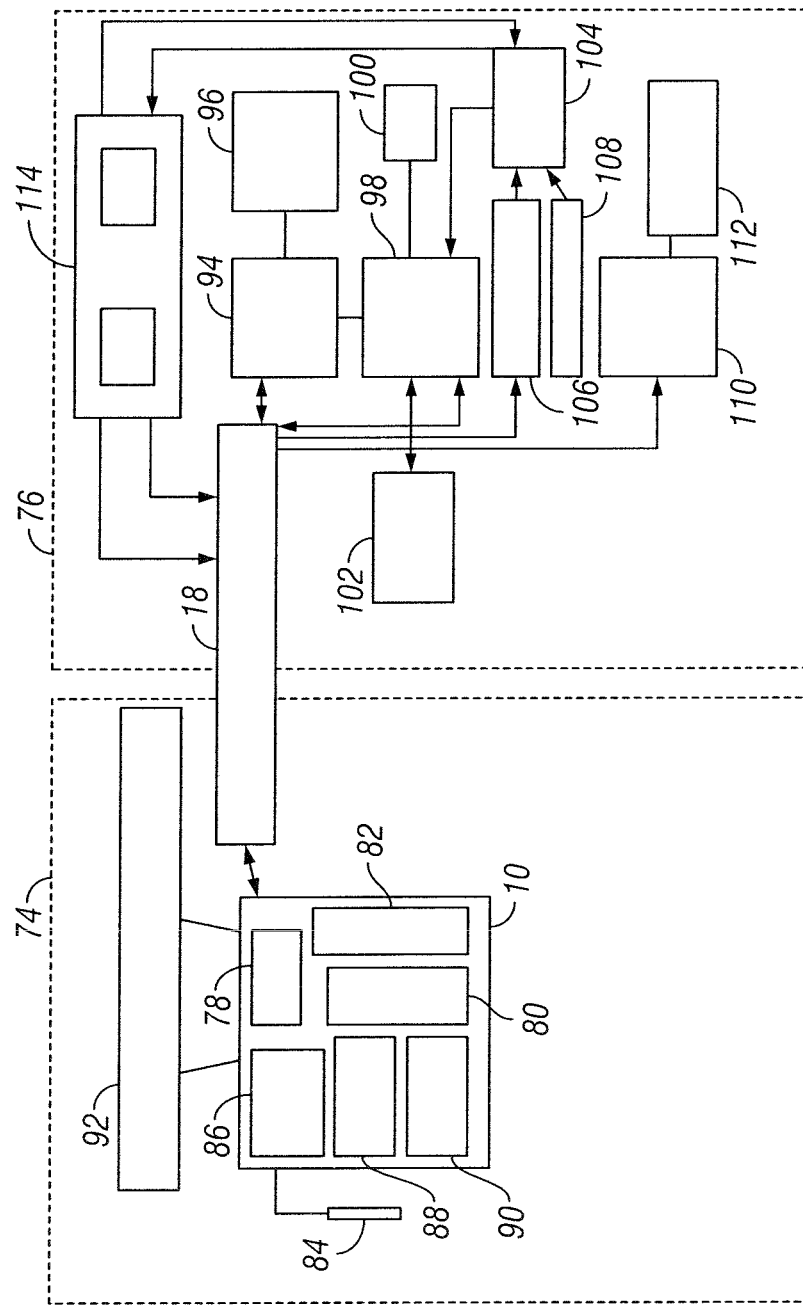
FIG. 14 illustrates an example implementation of a marine seismic vibrator coupled to a survey vessel.

An example implementation for controlling one or more marine seismic vibrators 10 is shown on FIG. 14. As illustrated, an in-water system 74 and an onboard system 76 may be used in control of the marine seismic vibrator 10. The onboard system 76 may be part of the recording system 8 shown on FIG. 1, for example. The onboard system 76 and the in-water system 74 may be coupled by a source cable 18. The source cable 18 may include electrical conductors (not shown separately) for transferring electrical current from the onboard system 76 to the in-water system 74. The source cable 18 may also include signal cables or fibers for transmitting signals to and/or from the in-water system 74 to the onboard system 76. The source cable 18 may also contain conductors for supplying air to the marine seismic vibrators 10 from the onboard system 76 for pressure compensation, for example.

As illustrated, the in-water system 74 may include the one or more marine seismic vibrators 10. A marine seismic vibrator 10 may include a controller 78, which may be, for example, a microprocessor-based controller, programmable logic controller, or similar device. The controller 78 may be coupled to the source cable 18 for receiving and/or transmitting signals to and/or from the onboard system 76. The controller 78 may receive, for example, near-field hydrophone signals, temperature, internal pressure, and external pressure, among others, which then may be sent to the onboard system 76 for quality control. From the onboard system 76, the controller 78 may receive the source sequence, for example. The marine seismic vibrator 10 may also include an electrical driver 80, which may be used to generate the seismic energy. The electrical driver 80 may be coupled to a power modulator 82. The power modulator 82 may receive direct current power from the onboard system 76. The power modulator 82 may output modulated current power to the electrical driver 80. The in-water system 74 may also include a near-field sensor 84, which may be a conventional seismic sensor, such as hydrophones, geophones, particle velocity sensors, particle displacement sensors, particle acceleration sensors, or pressure gradient sensors, for example. The near-field sensor 84 may be positioned to detect the source signature of the adjacent marine seismic vibrator 10. In some embodiments, the source signature may be combined with the source signatures detected by the other near-field sensors 84 in a seismic source array (e.g., array 68 shown on FIG. 12). Sensor electronics 86 for the near-field sensor 84 may be disposed on the adjacent marine seismic vibrator 10. Sensor electronics 86 may include, for example, an accelerometer, temperature sensors, and the like. The marine seismic vibrator 10 may also include additional electronics, such as pressure sensors 88 for pressure compensation and temperature sensors 90 for a cooling system. The pressure sensors 88 may be used to measure both internal and external pressure. As discussed in more detail below, the pressure sensors 88 may be used for pressure compensation such that the internal pressure of the marine seismic vibrator 10 is substantially the same as the external water pressure. The temperature sensors 90 may be used with a cooling system (not shown) to monitor vibrator temperature and prevent overheating, for example. A handling system 92 may be coupled to the marine seismic vibrator 10, which may include floats and a system for varying depth and/or lateral position of the marine seismic vibrator 10, such as pulleys, ropes, cables, deflectors, and/or the like.

As illustrated, the onboard system 76 may be coupled to the in-water system 74 by way of the source cable 18. The onboard system 76 may include a power supply 94. The power supply 94 may supply the in-water system 74, for example, with direct current power. In some embodiments, the power supply 94 for the onboard system 76 may be coupled to the vessel's power system 96. In some embodiments, a power supply may be part of the in-water system 74, either in addition to, or in place of, the power supply 94 of the onboard system 76. The onboard system 76 may also include a control system 98. The control system 98 may generate and send the control signals such as the source sequence to the in-water system 74 for actuation of the marine seismic vibrator 10. The control system 98 may include, for example, any microprocessor-based controller, programmable logic controller, or similar device. An air supply 100 may be coupled to the control system 98 to, for example, provide air for pressure compensation to the marine seismic vibrator 10. In some embodiments, air may be supplied to the marine seismic vibrator 10 by an attached air bottle rather than a separate air supply 100. As would be understood by one of ordinary skill in the art with the benefit of this disclosure, air supply 100 may be designed to supply selected gases to meet specific operational conditions, such as depth or temperature. The control system 98 may be coupled to a user interface 102 for the marine seismic vibrator 10, which may include a monitor, keyboard, or other equipment, to allow a user to receive and input data. The control system 100 may also receive input from a navigation system 104. From the navigation system 104, the control system 98 may receive an indication of when to start the source sequence based on vessel position, for example. The navigation system 104 may generate the start indication based on position data 106. The position data 106 may include current position of the marine seismic vibrator 10 based on data from a global position system, acoustic data, or information, that may be received from marine seismic vibrator 10, for example. The navigation system 104, for example, may also use historical data 108 concerning source locations from previous surveys to steer the sources to a desired position to repeat a survey. The onboard system 76 may also include a recording system 110 for recording the source signal and near-field data. The source signal and near-field data may be used for a number of functions, including quality control. A separate recording system 112 may be used to record data generated by the near-field sensor 84, which may also be used for quality control. The onboard system 76 may further include a vibrator steering system 114, which may include a control system 116 and a user interface 118, for example. The vibrator steering system 114 may be used, for example, with the deflectors 70 shown on FIG. 13. The vibrator steering system 114 may receive position location from the navigation system 104 and output deflector angle and deflector steering instructions to the handling system 92.

As previously mentioned, embodiments of the marine seismic vibrators 10 may use active pressure compensation. Pressure compensation may be used, for example, to equalize external and internal pressure. As shown on FIG. 14, the marine seismic vibrators 10 may include pressure sensors 88 that may be measure the external pressure of the water and the internal pressure of the vibrator interior. From these measurements, a differential pressure between the water and the vibrator interior may be determined. When the marine seismic vibrator 10 is descending, air (or other selected gases) may be supplied to increase the interior pressure. The air may be supplied from the air supply 100 on the onboard system 76 or an attached water bottle. When the desired depth is reached, valves may be closed so that no air can escape during operations. If needed adjustment of the internal pressure may be performed between sweeps. During retrieval of the marine seismic vibrator 10, excess air may be let out into the water.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below it is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A marine seismic vibrator comprising:
   a shell having a spring constant selected to provide a first resonance frequency within an operational frequency range of about 1 Hz and about 300 Hz, wherein the shell comprises endbeams and shell side portions coupled to the endbeams, wherein a plurality of protruding ribs are disposed on either side of a mid-line of the at least one of the shell side portions, and wherein the protruding ribs force the corresponding shell side portions to bend at the mid-line;
   a driver disposed within the shell and having a first end and a second end; and
   a spring element coupled to the shell between the first end and the second end of the driver, wherein the spring element has a second mode of oscillation that provides a second resonance frequency within the operational frequency range.

2. The marine seismic vibrator of claim 1, wherein the shell side portions are hingedly coupled to the endbeams.

3. The marine seismic vibrator of claim 1, wherein the protruding ribs force the shell side portions to stay in a first mode of oscillation.

4. The marine seismic vibrator of claim 1, wherein the spring element is hingedly coupled to the endbeams.

5. The marine seismic vibrator of claim 1, wherein the first resonance frequency of the marine seismic vibrator is within a two octave band of a low end of the operational frequency range, and wherein the second resonance frequency of the marine seismic vibrator is within a four octave band of the first resonance frequency.

6. The marine seismic vibrator of claim 1, wherein the operational frequency range is from about 5 Hz to about 100 Hz.

7. The marine seismic vibrator of claim 1, wherein the protruding ribs each have a height ranging from about 0.25 inches to about 5 inches, a width ranging from about 1 inch to about 20 inches, and a length ranging from about 1 inch to about ½ a width of the shell.

8. The marine seismic vibrator of claim 1, wherein the protruding ribs are hollow.

9. The marine seismic vibrator of claim 1, wherein the protruding ribs are removably affixed to the at least one of the shell side portions.

10. The marine seismic vibrator of claim 1, wherein the protruding ribs are convex.

11. The marine seismic vibrator of claim 1, wherein the protruding ribs and the at least one of the shell side portions are unitary.

12. The marine seismic vibrator of claim 1, wherein the protruding ribs comprise metallic bars coupled to the at least one of the shell side portions.

13. The marine seismic vibrator or claim 1, wherein the protruding ribs comprises reinforcing fibers.

14. The marine seismic vibrator of claim 1, wherein the protruding ribs are aligned in columns disposed on either side of the midline.

15. An array of marine seismic vibrators comprising:
one or more low frequency marine seismic vibrators, wherein the one or more low frequency marine seismic vibrators each comprise:
a first shell having a spring constant selected to provide a first resonance frequency within a first operational frequency range of about 5 Hz and about 25 Hz, wherein the first shell comprises endbeams and shell side portions coupled to the endbeams, wherein a plurality of protruding ribs are disposed on either side of a midline of at least one of the shell side portions of the first shell, wherein the protruding ribs of the first shell force the corresponding shell side portions to bend at the midline;
a first driver disposed within the shell and having a first end and a second end; and
a first spring element coupled to the shell between the first end and the second end of the driver; wherein the spring element has a second mode of oscillation that provides a second resonance frequency within the first operational frequency range; and
one or more high frequency marine seismic vibrators, wherein the one or more high frequency marine seismic vibrator each comprise:
a second shell having a spring constant selected to provide a first resonance frequency within an second operational frequency range of about 25 Hz to about 100 Hz, wherein the second shell comprises endbeams and shell side portions coupled to the endbeams, wherein a plurality of protruding ribs are disposed on either side of a midline of at least one of the shell side portions of the second shell, wherein the protruding ribs of the second shell force the corresponding shell side portions to bend at the midline;
a second driver disposed within the shell and having a first end and a second end; and
a second spring element coupled to the shell between the first end and the second end of the driver; wherein the spring element has a second mode of oscillation that provides a second resonance frequency within the second operational frequency range.

16. The array of claim 15, wherein the protruding ribs of the first shell force the corresponding shell side portions to stay in a first mode of oscillation, and wherein the protruding ribs of the second shell force the corresponding shell side portions to stay in a first mode of oscillation.

17. The array of claim 15, wherein the first resonance frequency of the one or more low frequency marine seismic vibrators is within a two octave band of a low end of the operational frequency range, and wherein the second resonance frequency of the one or more low frequency marine seismic vibrators is within a four octave band of the first resonance frequency.

18. The array of claim 15 further comprising one or more additional marine seismic vibrators having an operational frequency from about 100 Hz to about 200 Hz.

19. The array of claim 15 wherein the array comprises four of the low frequency marine seismic vibrators and eight of the high frequency marine vibrators.

20. The array of claim 15 further comprising an air supply located on a survey vessel for supplying air for pressure compensation in the low frequency marine vibrators and the high frequency marine vibrators.

21. A marine seismic vibrator comprising:
a shell having a spring constant selected to provide a first resonance frequency within an operational frequency range of about 1 Hz and about 300 Hz, wherein the shell comprises beams disposed on either end of the shell and two shell side portions hingedly coupled to the beams; wherein the two shell side portion each comprise an outer surface and ribs that are spaced along the outer surface in columns on either side of a midline, wherein the ribs extend outwardly from the outer surface;
a fixture disposed within the shell and coupled to the beams;
a linear drive mounted on the fixture and having a first end and a second end; and
a spring element coupled to the shell between the first end and the second end of the driver, wherein the spring element has a second mode of oscillation that provides a second resonance frequency within the operational frequency range.

22. The marine seismic vibrator of claim 21, wherein the ribs each have a height ranging from about 0.25 inches to about 5 inches, a width ranging from about 1 inch to about 20 inches, and a length ranging from about 1 inch to about ½ a width of the shell.

* * * * *